US008658277B2

(12) United States Patent
Wyndham et al.

(10) Patent No.: US 8,658,277 B2
(45) Date of Patent: Feb. 25, 2014

(54) POROUS INORGANIC/ORGANIC HYBRID MATERIALS WITH ORDERED DOMAINS FOR CHROMATOGRAPHIC SEPARATIONS AND PROCESSES FOR THEIR PREPARATION

(75) Inventors: Kevin D. Wyndham, Douglas, MA (US); John E. O'Gara, Ashland, MA (US)

(73) Assignee: Waters Technologies Corporation, Milford, MA (US)

( * ) Notice: Subject to any disclaimer, the term of this patent is extended or adjusted under 35 U.S.C. 154(b) by 777 days.

(21) Appl. No.: 11/631,341

(22) PCT Filed: Jul. 15, 2005

(86) PCT No.: PCT/US2005/025106
§ 371 (c)(1),
(2), (4) Date: Jan. 25, 2008

(87) PCT Pub. No.: WO2006/019988
PCT Pub. Date: Feb. 23, 2006

(65) Prior Publication Data
US 2008/0269368 A1    Oct. 30, 2008

Related U.S. Application Data

(60) Provisional application No. 60/592,971, filed on Jul. 30, 2004.

(51) Int. Cl.
*B32B 3/00* (2006.01)
*B32B 3/26* (2006.01)

(52) U.S. Cl.
USPC ............... 428/314.2; 428/312.2; 428/312.6; 428/304.4; 428/316.6; 428/309.9; 210/198.2

(58) Field of Classification Search
USPC ..................................................... 526/279
See application file for complete search history.

(56) References Cited

U.S. PATENT DOCUMENTS

| | | | |
|---|---|---|---|
| 3,892,678 A | 7/1975 | Halasz et al. | |
| 3,935,299 A | 1/1976 | Kiselev et al. | |
| 4,017,528 A | 4/1977 | Unger et al. | |
| 4,029,583 A | 6/1977 | Ho Chang et al. | |
| 4,104,363 A | 8/1978 | Vozka et al. | |
| 4,169,069 A * | 9/1979 | Unger et al. | 428/402.24 |
| 4,324,689 A | 4/1982 | Shah | |
| 4,327,191 A | 4/1982 | Dromard et al. | |
| 4,334,118 A | 6/1982 | Manning | |
| 4,724,207 A | 2/1988 | Hou et al. | |
| 4,775,520 A | 10/1988 | Unger et al. | |
| 4,889,632 A | 12/1989 | Svec et al. | |
| 4,911,903 A | 3/1990 | Unger et al. | |
| 4,923,610 A | 5/1990 | Svec et al. | |
| 4,952,349 A | 8/1990 | Svec et al. | |
| 4,983,369 A | 1/1991 | Barder et al. | |
| 5,068,387 A | 11/1991 | Kleyer et al. | |
| 5,071,565 A | 12/1991 | Fritz et al. | |
| 5,108,595 A | 4/1992 | Kirkland et al. | |
| 5,137,627 A | 8/1992 | Feibush | |
| 5,154,822 A | 10/1992 | Simpson et al. | |
| 5,177,128 A | 1/1993 | Lindemann et al. | |
| 5,194,333 A | 3/1993 | Ohnaka et al. | |
| 5,256,386 A | 10/1993 | Nystrom et al. | |
| 5,271,833 A | 12/1993 | Funkenbusch et al. | |
| 5,298,833 A | 3/1994 | Hou | |
| 5,304,243 A | 4/1994 | Yamaguchi et al. | |
| 5,374,755 A | 12/1994 | Neue et al. | |
| 5,378,790 A | 1/1995 | Michalczyk et al. | |
| 5,403,908 A | 4/1995 | Watanabe et al. | |
| 5,425,930 A | 6/1995 | Anderson | |
| 5,453,185 A | 9/1995 | Frechet et al. | |
| 5,498,678 A | 3/1996 | Steffier | |
| 5,548,051 A | 8/1996 | Michalczyk et al. | |
| 5,558,849 A | 9/1996 | Sharp | |
| 5,565,142 A | 10/1996 | Deshpande et al. | |
| 5,624,875 A | 4/1997 | Nakanishi et al. | |
| 5,637,135 A | 6/1997 | Ottenstein et al. | |
| 5,650,474 A | 7/1997 | Yamaya et al. | |
| 5,651,921 A | 7/1997 | Kaijou et al. | |
| 5,667,674 A * | 9/1997 | Hanggi et al. ............. | 210/198.2 |
| 5,728,457 A | 3/1998 | Frechet et al. | |
| 5,734,020 A | 3/1998 | Wong | |
| 5,856,379 A | 1/1999 | Shiratsuchi et al. | |
| 5,869,152 A | 2/1999 | Colon | |

(Continued)

FOREIGN PATENT DOCUMENTS

| | | |
|---|---|---|
| EP | 0852334 | 7/1998 |
| EP | 1163050 | 12/2001 |
| JP | 50-080400 A | 6/1975 |
| JP | 58-120525 A | 7/1983 |
| JP | 59-054619 A | 3/1984 |
| JP | 06-064915 A | 3/1994 |
| JP | 2893104 A | 9/1995 |
| JP | 07247180 | 9/1995 |
| JP | 09-278485 A | 10/1997 |
| JP | 10062401 A | 3/1998 |

(Continued)

OTHER PUBLICATIONS

Asiaie et al., Sintered Octadecylsilica as Monolithic Column Packing in Capillary Electrochromatography and micro High-Performance LiquidChromatography, Journal of chromatography A, 806 (1998), 251-263}.
Bereznitski, et al. "Characterization of silica-based octyl phases of different bonding density part II. Studies of surface properties andchromatographic selectivity," 1998. J. Chromatogr. A 828:59-73.
Boury et al. "Generation of porosity in a hybrid organic-inorganic xerogel by chemical treatment," 1999. New J. Chem. 23: 531-538.

(Continued)

*Primary Examiner* — Irina Krylova
(74) *Attorney, Agent, or Firm* — Edwards Wildman Palmer LLP; Nicholas J. DiCeglie, Jr.

(57) ABSTRACT

Porous hybrid inorganic/organic materials comprising ordered domains are disclosed. Methods of making the materials and use of the materials for chromatographic are also disclosed.

50 Claims, 5 Drawing Sheets

(56) References Cited

U.S. PATENT DOCUMENTS

| | | | |
|---|---|---|---|
| 5,965,202 | A | 10/1999 | Taylor-Smith et al. |
| 5,976,479 | A | 11/1999 | Alcaraz et al. |
| 6,017,632 | A | 1/2000 | Pinnavaia et al. |
| 6,022,902 | A | 2/2000 | Koontz |
| 6,027,643 | A | 2/2000 | Small et al. |
| 6,090,477 | A | 7/2000 | Burchell et al. |
| 6,136,187 | A | 10/2000 | Zare et al. |
| 6,183,867 | B1 | 2/2001 | Barthel et al. |
| 6,207,098 | B1 | 3/2001 | Nakanishi et al. |
| 6,210,570 | B1 | 4/2001 | Holloway |
| 6,227,304 | B1 | 5/2001 | Schlegel |
| 6,238,565 | B1 | 5/2001 | Hatch |
| 6,248,686 | B1 | 6/2001 | Inagaki et al. |
| 6,251,280 | B1* | 6/2001 | Dai et al. .................. 210/656 |
| 6,271,292 | B1 | 8/2001 | Mager et al. |
| 6,277,304 | B1 | 8/2001 | Wei et al. |
| 6,281,257 | B1 | 8/2001 | Ma et al. |
| 6,288,198 | B1 | 9/2001 | Mechtel et al. |
| 6,313,219 | B1 | 11/2001 | Taylor-Smith |
| 6,380,266 | B1 | 4/2002 | Katz et al. |
| 6,395,341 | B1 | 5/2002 | Arakawa et al. |
| 6,465,387 | B1 | 10/2002 | Pinnavaia et al. |
| 6,476,098 | B1 | 11/2002 | Arakawa et al. |
| 6,528,167 | B2* | 3/2003 | O'Gara ....................... 428/405 |
| 6,599,951 | B2 | 7/2003 | Zampini et al. |
| 6,663,668 | B1 | 12/2003 | Chaouk et al. |
| 6,686,035 | B2 | 2/2004 | Jiang et al. |
| 7,175,913 | B2 | 2/2007 | O'Gara |
| 7,223,473 | B2 | 5/2007 | Jiang et al. |
| 7,250,214 | B2 | 7/2007 | Walter et al. |
| 7,439,272 | B2 | 10/2008 | Xu |
| 2001/0033931 | A1 | 10/2001 | Jiang et al. |
| 2002/0070168 | A1* | 6/2002 | Jiang et al. ................. 210/656 |
| 2003/0150811 | A1 | 8/2003 | Walter et al. |
| 2004/0048067 | A1 | 3/2004 | O'Gara |
| 2004/0191516 | A1 | 9/2004 | Jiang et al. |
| 2005/0230298 | A1 | 10/2005 | Jiang et al. |
| 2006/0194919 | A1 | 8/2006 | Lichtenhan et al. |

FOREIGN PATENT DOCUMENTS

| | | | |
|---|---|---|---|
| JP | 10328558 A | | 12/1998 |
| WO | 9858253 A1 | | 12/1998 |
| WO | 9937705 A1 | | 7/1999 |
| WO | 00/45951 | | 8/2000 |
| WO | 01/18790 A1 | | 3/2001 |
| WO | 03/014450 | | 2/2003 |
| WO | 03/022392 | | 3/2003 |
| WO | WO 2004041398 | * | 5/2004 |
| WO | 2005/079427 | | 9/2005 |

OTHER PUBLICATIONS

Boury et al., "Hybrid organic-inorganic xerogel access to meso- and microporous silica by thermal and chemical treatment," 1999. Chem. Mater. 11:281-291.

Chujo et al., "New Preparation Methods for Organic=lnorganic Polymer Hybrids", Mrs Bulletin/May 2001; 389-392.

Collioud, et al. "Oriented and covalent immobilization of target molecules to solid supports: synthesis and application of a light-activatable and thiol-reactive cross-linking reagent," 1993. Bioconjugate 4:528-536.

International Search Report (PCT/ISA/210) Issued in PCT/US2008/02312.

Czajkowska et al., "Adsorption, thermogravimetric, and chromatographic studies of bare silicas and silica-based octyl bonded phases," 1998. J. Liq. Chromatogr. Relat. Technol. 21:1957-1977.

Dulay et al., "Preparation and Characterization of Monolithic Porous Capillary Columns Loaded with Chromatographic Particles", Anal. Chem., 70(23): 5103-5107 (1998).

Feng et al., "Synthese of Polystyrene-silica hybrid mesoporous materials via the nonsurfactant-templated . . . ", J. Mater. Chem, 2000, 10, 2490-2494.

Feng et al., "Synthesis of Polymer-Modified Mesoporous Materials Via the Nonsurfactant-Templated Sol-Gel Process", Polymer Preprints 2000, 41(1), 515-516.

Goldstein, et al., "Microwave Sintereing of Amorphous Silica Powders", J. of Mat. Sci. Letters, 16: 310-312 (1997).

Grun et al., Microporous and Mesoporous Materials 1999, 27, pp. 207.

Hanson, M. J. Chromatography A, 1993, 656, pp. 369.

Hileman, F.D. et al. Anal. Chem. 1973, 45, pp. 1126.

Inagaki, et al. J. Am. Chem. Soc. 1999, 121, 9611.

ISR (PCT/ISA/210) Issued in PCT/US2007/026246.

Jones et al., "The oxidation of the carbon-silicon bond," 1996. Tetrahedron, 52(22):7599-7662.

MacBeath et al., "Printing proteins as microarrays for high-throughput function determination," 2000. Science 289:1760-1763.

Maskos et al., "Oligonucleotide hybridizations on glass supports: a novel linker for oligonucleotide synthesis and hybridization properties of oligonucleotides synthesised in situ," 1992. Nucleic Acids Research 20(7):1679-1684.

Nawrocki et al., "Influence of silica surface chemistry and structure on the properties, structure and coverage of alkyl-bonded phases for high-performance liquid chromatography," 1988. J. of Chromatography 449(1):1-24.

Nawrocki, "Silica surface controversies, strong adsorption sites, their blockage and removal. Part 1," 1991. Chromatographia 31(3-4):177-192.

Neue et al., "Use of high-performance LC packings from pH 1 to pH 12," 1999 American Laboratory, p. 36-39.

O'Gara et al., "Dependence of cyano bonded phase hydrolytic stability on ligand structure and solution pH," 2000 J. Chromatogr. A 893:245-251.

O'Gara et al., "Simple preparation of C8 HPLC stationary phase with an internal polar functional group," 1995 Analytical Chemistry 67:3809-13.

Perry, R.J., Chemtech, 1999, pp. 39.

Petro, M. et al., Chromatographia, 1993, 9110, pp. 549.

Reynolds et al., "Submicron sized organo-silica spheres for capillary electrochromatography," 2000 J. Liq. Chrom & Rel. Technol., 23(1):161-173.

Silsesquixanes—An Introduction to Hybrid Inorganic—Organic Composites—Data by Sigma Aldrich. Retrieved Dec. 4, 2006 from http://www.azom.com/details.asp?ArticleID=2934.

Tamaki et al., "Synthesis of polystyrene/silica gel polymer hybrids by in-situ polymerization method", Polymer Bulletin 39, 303-310 (1997).

Tamao et al., "Hydrogen peroxide oxidation of the silicon-carbon bond in organoalkoxysilanes," 1983 Organometallics 2: 1694-1696.

Tamao et al., "Oxidative cleavage of silicon-carbon bonds in organosilicon flourides to alcohols," 1982 Tetrahedron 39 (6):983-990.

Tamao, K. "Oxidative cleavage of the silicon-carbon bond: Development, mechanism, scope, and limitations," 1996 Advances in Silicon Chemistry, 3:1-62.

Tang et al., "Continuous-Bed Columns Containing Sol-Gel Bonded Octadecylsilica for Capillary Liquid Chromatography", J. Microcolumn Separations, 12: 6-12 (2000).

Tang et al., "Monolithic Columns Containing Sol-Gel Bonded Octadecylsilica for Capillary Electrochrmoatography", J. Chromatogr. A, 837: 35-50 (1999).

Ueno et al., "Compaction an dSintering Behavior of Silica Particles Surface-Modified by Al Chelate Compounds", Journal of the Ceramic Society of Japan, 109(3): 210-216 (2001).

Unger et al., "Recent developments in the evaluation of chemically bonded silica packings for liquid chromatography," J. Chromatogr. 1976, 125(1): 115-127.

Wei et al., "Polymethacrylate-silica Hybrid nanoporous materials . . . ", Adv. Mater. 2000, 12, No. 19, Oct. 2, 1448-1450.

Wei et al., "Synthesis and Biotechnological Application of Vinyl Polyme-Inorganic Hybrid . . . ", Chinese Journal of Polymer Science, vol. 18, No. 1, (2000), 1-7.

WO-PCT/IB/326—International Preliminary Report on Patentability issued for PCT/US2008/002312.

Written Opinion (PCT/ISA/210) Issued in PCT/US2007/026246.

(56) References Cited

OTHER PUBLICATIONS

Xin, et al., "Design and Evaluation of a New Capillary Electrochromatography System", Electrophoresis, 20: 67-73 (1999).

Yang et al., "Oxidative cleavage of carbon-silicon bond as a new method to characterize bonded stationary phases on silica gel," 1998 Anal. Chem. 70:2827-2830.

Inagaki, Shinji, et al., An ordered mesoporous organosilica hybrid material with a crystal-like wall structure, Nature, Mar. 21, 2002, vol. 416, No. 6878, p. 304-307.

Reporting letter from Kawaguti & Partners dated Jul. 12, 2011 advising receipt of Official Action regarding corresponding Japanese Patent Application No. 2007-523612.

Office Action from Japanese Patent Office dated Jun. 14, 2011 regarding corresponding Japanese Patent Application No. 2007-523612.

English translation of Office Action from Japanese Patent Office dated Jun. 14, 2011 regarding corresponding Japanese Patent Application No. 2007-523612.

\* cited by examiner

A

B

POROUS INORGANIC/ORGANIC HYBRID MATERIALS WITH ORDERED DOMAINS FOR CHROMATOGRAPHIC SEPARATIONS AND PROCESSES FOR THEIR PREPARATION

RELATED APPLICATIONS

This application is a U.S. national phase application, pursuant to 35 U.S.C. §371, of PCT international application Ser. No. PCT/US2005/025106, filed Jul. 15, 2005, designating the United States and published in English on Feb. 23, 2006 as publication WO 2006/019988 A1, which claims priority to U.S. provisional application Ser. No. 60/592,971, filed Jul. 30, 2004. The entire contents of the aforementioned patent applications are incorporated herein by this reference.

BACKGROUND OF THE INVENTION

Materials for chromatographic separations can be generally classified as inorganic (e.g., silica), organic (e.g., polydivinylbenzene), or hybrid inorganic/organic materials.

As stationary phases for HPLC, organic-based materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silica.

Silica-based materials are mechanically strong and result in columns that do not show evidence of shrinking or swelling. However, limited hydrolytic stability is a drawback with silica-based columns, because silica may be readily dissolved under alkaline conditions, generally pH >8.0, leading to the subsequent collapse of the chromatographic bed. Additionally, the bonded phase on a silica surface may be removed from the surface under acidic conditions, generally pH <2.0, and eluted off the column by the mobile phase, causing loss of analyte retention.

Porous inorganic/organic hybrid materials have been introduced to overcome the above-mentioned deficiencies while attempting to maintain the beneficial properties of purely organic and purely inorganic materials. These materials are synthesized from a mixture of inorganic and organofunctional silane monomers to prepare a copolymer, e.g. $SiO_2/RSiO_{1.5}$ or $SiO_2/R(SiO_{1.5})_2$ and can be either particulate or monolithic in form. See, e.g., K. Unger, J. Schick-Kalb, U.S. Pat. No. 4,017,528; A. Sayari, S. Hamoudi, *Chem. Mater.* 13 (2001) 3151; K. Nakanishi, N. Soga, T. Minakuchi, U.S. Pat. No. 6,207,098; K. Nakanishi, N. Soga, Japanese patent application 2,893,104.

However, there is a number of problems with these materials when used in chromatographic separations. By and large, these problems arise because the particulate forms have been made by direct co-condensation of the monomers into a silicate form or via an intermediate poly(organosiloxane) (POS). The resultant particles are commonly irregular in shape, are not highly spherical, or have an irregular surface morphology. Because of these irregularities in shape or morphology, these particles do not afford the packing of highly efficient columns that are required for good chromatography. The particles further contain a large population of micropores with a diameter of about <40 Å. It is known that the diffusion of a molecule in the pores of a material slows down measurably as the pore size becomes smaller than about 10 times the size of the analyte molecule, resulting in poor peak shape and band broadening. As a result, materials with a large population of micropores are not particularly useful for most chromatographic separations and have little utility.

In the case of monolithic materials, many of the monoliths lack macropores that are required for low operating backpressures. In monolith cases where macropores have been achieved, the monoliths contain a large population of micropores with a diameter of about <40 Å and suffer the same disadvantages as described above. Hybrid materials containing only a small population of micropores and a sufficient population of mesopores have been reported to solve this problem. See, e.g., Z. Jiang, R. Fisk, J. O'Gara, T. Walter, K. Wyndham U.S. Pat. No. 6,686,035, and T. Walter, J. Ding, M. Kele, J. O'Gara, P. Iraneta WO 03/014450.

However, the removal of the deleterious micropores is achieved by a hydrothermal treatment and comes at the expense of decreasing surface area, which consequently diminishes the material's retention capacity. In addition, the removal of the deleterious micropores results in a unimodal mesopore population that is polydisperse. Finally, all of the hybrid materials containing only a small population of micropores and a sufficient population of mesopores are amorphous or disordered.

Thus, there is a need for hybrid materials having ordered domains, in which chromatographically desirable morphologies (e.g., spherical particles and monoliths with a bimodal pore size distribution of macropores and mesopores) are preserved. Although the analogous preservation of purely inorganic silica gel particles has been reported, see, e.g., T. Martin, A. Galarneau, F. Di Renzo, F. Fajula, D. Plee, *Angew. Chem. Int. Ed.* 41 (2002) 2590, this has not yet been achieved for hybrid materials, especially those with a chromatographically-enhancing pore geometry. Therefore, porous inorganic/organic hybrid materials comprising ordered domains and, advantageously, a chromatographically-enhancing pore geometry are needed.

SUMMARY OF THE INVENTION

The present invention provides novel materials for chromatographic separations, processes for their preparation, and separations devices containing the chromatographic materials. In particular, the invention provides porous inorganic/organic hybrid materials comprising ordered domains and, in certain embodiments, chromatographically-enhancing pore geometries.

Thus, in one aspect the invention provides a porous hybrid inorganic/organic material comprising ordered domains and having a chromatographically-enhancing pore geometry.

In another aspect, the invention provides a porous hybrid inorganic/organic material comprising ordered domains having formula I, II or III below:

$$(A)_x(B)_y(C)_z \qquad \text{(Formula I)}$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x, y are positive numbers and z is a non negative number, wherein when z=0, then 0.002≤x/y≤210, and when z≠0, then 0.0003≤y/z≤500 and 0.002≤x/(y+z)≤210;

 (Formula II)

wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x, y are positive numbers and z is a non negative number, wherein when z=0, then 0.002≤x/(y+y*)≤210, and when z≠0, then 0.0003≤(y+y*)/z≤500 and 0.002≤x/(y+y*+z)≤210; or

 (Formula III), wherein x and y are whole number integers and A is

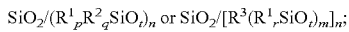

wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100;

B is:

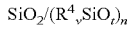

wherein $R^4$ is hydroxyl, fluorine, alkoxy, aryloxy, substituted siloxane, protein, peptide, carbohydrate, nucleic acid, or combinations thereof, $R^4$ is not $R^1$, $R^2$, or $R^3$; v is 1 or 2, provided that when v=1, t=1.5, and when v=2, t=1; and n is a number from 0.01 to 100;

wherein the material of formula III has an interior area and an exterior surface, and said interior area of said material has a composition represented by A; said exterior surface of said material has a composition represented by A and B, and wherein said exterior composition is between about 1 and about 99% of the composition of B and the remainder comprising A.

Another aspect of the invention provides a method of preparing the porous hybrid inorganic/organic materials provided by the invention. The method comprises the steps of:

(a) forming a pore restructuring template;
(b) restructuring the pores of a porous hybrid inorganic/organic material by contacting the pores of the porous hybrid inorganic/organic material with the pore restructuring template, to thereby restructure the pores into ordered domains; and
(c) removing the pore restructuring template from the restructured pores; to thereby prepare a porous hybrid inorganic/organic material comprising ordered domains.

The invention also provides separations device comprising the porous hybrid inorganic/organic hybrid materials having ordered domains provided by the invention. In a related aspect, the invention provides a chromatographic column comprising a column having a cylindrical interior for accepting a porous hybrid inorganic/organic material, and a chromatographic bed comprising a porous hybrid inorganic/organic material having ordered domains provided by the invention.

In another aspect, the invention provides porous hybrid inorganic/organic materials having ordered domains, wherein the materials are prepared by a method comprising the steps of:

(a) forming a pore restructuring template;
(b) restructuring the pores of a porous hybrid inorganic/organic material by contacting the pores of the porous hybrid inorganic/organic material with the pore restructuring template, to thereby restructure the pores into ordered domains; and
(c) removing the pore restructuring template from the restructured pores.

DETAILED DESCRIPTION OF THE INVENTION

Figure 1:
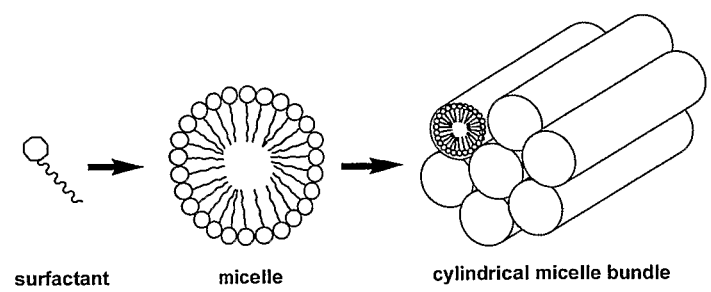
FIG. 1 shows the formation of one type of pore restructuring template in the form of a cylindrical micelle bundle of pore templating molecules (e.g., surfactant).

The present invention will be more fully illustrated by reference to the definitions set forth below.

The term "hybrid", i.e., as in "porous inorganic/organic hybrid materials" includes inorganic-based structures wherein an organic functionality is integral to both the internal or "skeletal" inorganic structure as well as the hybrid material surface. The inorganic portion of the hybrid material may be, e.g., alumina, silica, titanium or zirconium oxides, or ceramic material. In a preferred embodiment, the inorganic portion of the hybrid material is silica.

"Ordered domains" are those found in porous inorganic/organic hybrid materials that exhibit diffraction peaks from about 0.8 to about 20° scan range (x-axis, 2θ units) as measured by X-ray powder diffraction (XRPD). XRPD is a well known characterization technique in the art (see, R. Jenkins, R. L. Snyder, Introduction to X-ray Powder Diffractometry, John Wiley & Sons, Inc., New York, © 1996). The 2θ position of the observed diffraction peak maxima observed for porous inorganic/organic hybrid materials with ordered domains excludes the diffraction peak at about 20° to about 23° 2θ that results from atomic-range order and which is observed and well known for amorphous materials. The percentage by mass of ordered domains within porous inorganic/organic hybrid materials of the invention may be from 1-100%, where the balance of the mass is amorphous. Hybrid materials with ordered domains may be further characterized by symmetry or space groups that are derived from XRPD, including but not limited to hexagonal (p6 mm), cubic (Ia3d), triclinic, monoclinic, orthorhombic, tetragonal, trigonal, and lamellar.

A "pore restructuring template" is defined as an agent that acts to organize hybrid silicates to afford ordered domains within the hybrid material as the silicates dissolve and then precipitate during hydrothermal treatment. A pore restructuring template is comprised of one or more pore templating molecules and, optionally one or more template swelling molecules.

A "pore templating molecule" is defined as a molecule which combines with other pore templating molecules to form micelles, vesicles, or networks of a variety of shapes, sizes, symmetries and orders, e.g. cylindrical, spherical, hexagonal, cubic, triclinic, monoclinic, orthorhombic, tetragonal, trigonal, lamellar, unilamellar, planar, ellipsoidal, disklike, rod-like, globule, worm-hole, inverted or other higher order networks. One or a combination of two or more pore templating molecules can be used. The pore templating molecules are advantageously used above their critical micelle concentrations (CMC) when the CMC exists. Pore templating molecules may be ionic or non-ionic, and include a number of surfactants.

A "template swelling molecule" is defined as a molecule or group of molecules that act to swell a micelle, vesicle, or network of pore templating molecules to a larger physical size. "Chromatographically-enhancing pore geometry" is found in hybrid materials containing only a small population of micropores and a sufficient population of mesopores. A small population of micropores is achieved in hybrid materials when all pores of a diameter of about <34 Å contribute less than about 110 m$^2$/g to the specific surface area of the particle. Hybrid materials with such a low micropore surface area and with a sufficient population of mesopores give chromatographic enhancements including high separation efficiency and good mass transfer properties (as evidenced by, e.g., reduced band spreading and good peak shape).

"Micropore surface area" is defined as the surface area in pores with diameters less than or equal to 34 Å, determined by mulitpoint nitrogen sorption analysis from the adsorption leg of the isotherm using the BJH method A "sufficient population of mesopores" is achieved in hybrid materials when all pores of a diameter of about 35 Å to about 500 Å, e.g., preferably about 60 Å to about 500 Å, e.g., even more preferably about 100 Å to about 300 Å, sufficiently contribute to the specific surface area of the material, e.g., to about 35 to about 750 m$^2$/g, e.g., preferably about 65-550 m$^2$/g, e.g., even more preferably about 100 to 350 m$^2$/g to the specific surface area of the material.

Porous inorganic/organic hybrid materials with ordered domains may further be characterized by a unimodal or bimodal mesopore distributions. A modal point is defined as the point where the pore volume is maximized (i.e., highest frequency) as a function of pore diameter as determined from the dV/dlog(D) vs. D plot, as calculated from the desorption leg of a nitrogen isotherm using the BJH method. The materials may still further be characterized by structural orientations, orders, or patterns at the molecular to atomic scale level as measured by transmission electron microscopy (TEM).

A "unimodal mesopore distribution" is found where a single modal point is observed between 35 and 500 Å.

A "bimodal mesopore distribution" is found in hybrid materials that contain two modal points in the plot of between 35 and 500 Å where one modal point is located below 50 Å and the second is located above 50 Å.

The term "monolith" is intended to include a porous, three-dimensional material having a continuous interconnected pore structure in a single piece. A monolith is prepared, for example, by casting precursors into a mold of a desired shape. The term monolith is meant to be distinguished from a collection of individual particles packed into a bed formation, in which the end product comprises individual particles.

The terms "coalescing" and "coalesced" are intended to describe a material in which several individual components have become coherent to result in one new component by an appropriate chemical or physical process, e.g., heating. The term coalesced is meant to be distinguished from a collection of individual particles in close physical proximity, e.g., in a bed formation, in which the end product comprises individual particles.

The term "incubation" is intended to describe the time period during the preparation of the inorganic/organic hybrid monolith material in which the precursors begin to gel.

The term "aging" is intended to describe the time period during the preparation of the inorganic/organic hybrid monolith material in which a solid rod of monolithic material is formed.

The term "macropore" is intended to include pores of a material that allow liquid to flow directly through the material with reduced resistance at chromatographically-useful flow rates. For example, macropores of the present invention are intended to include, but are not limited to pores with a pore diameter larger than about 0.05 μm, pores with a pore diameter ranging from about 0.05 μm to about 100 μm, pores with a pore diameter ranging from about 0.11 μm to about 100 μm, and pores with a pore diameter ranging from about 0.5 μm to about 30 μm.

The term "chromatographically-useful flow rates" is intended to include flow rates that one skilled in the art of chromatography would use in the process of chromatography.

The term "functionalizing group" includes organic groups that impart a certain chromatographic functionality to a chromatographic stationary phase, including, e.g., octadecyl ($C_{18}$) or phenyl. Such functionalizing groups are present in, e.g., surface modifiers such as disclosed herein which are attached to the base material, e.g., via derivatization or coating and later crosslinking, imparting the chemical character of the surface modifier to the base material. In an embodiment, such surface modifiers have the formula $Z_a(R')_b Si-R$, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl.

The porous inorganic/organic hybrid particles and monolith materials with or without ordered domains possess both organic groups and silanol groups that may additionally be substituted or derivatized with a surface modifier. "Surface modifiers" include (typically) organic groups that impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of the hybrid materials react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. In general, the porous inorganic/organic hybrid particles and monolith materials can be modified by an organic group surface modifier, a silanol group surface modifier, a polymeric coating surface modifier, and combinations of the aforementioned surface modifiers.

For example, silanol groups are surface modified with compounds having the formula $Z_a(R')_b Si{-}R$, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl. In certain embodiments, the organic groups may be similarly functionalized.

The functionalizing group R may include alkyl, aryl, cyano, amino, diol, nitro, cation or anion exchange groups, or embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference. Such groups include those of the general formula

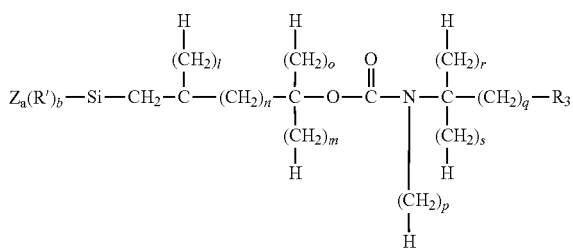

wherein l, m, o, r, and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

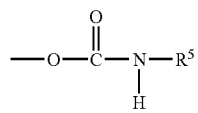

wherein $R^5$ may be, e.g., cyanoalkyl, t-butyl, butyl, octyl, dodecyl, tetradecyl, octadecyl, or benzyl. Advantageously, $R^5$ is octyl, dodecyl, or octadecyl.

In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. In certain embodiments the surface modifier is octadecyltrimethoxysilane.

In another embodiment, the hybrid material's organic groups and silanol groups are both surface modified or derivatized. In another embodiment, the hybrid materials are surface modified by coating with a polymer.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like. As used herein, the term "nitro" means $-NO_2$; the term "halogen" designates $-F$, $-Cl$, $-Br$ or $-I$; the term "thiol" means SH; and the term "hydroxyl" means $-OH$. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, $-CF_3$, $-CN$, or the like.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

OVERVIEW OF THE INVENTION

The invention provides porous hybrid inorganic/organic materials having ordered domains. In certain embodiments, the hybrid materials also possess a chromatographically-enhancing pore geometry. The materials may exist as spherical particles or monoliths.

The ordered domains of the materials are achieved by restructuring the pores of porous hybrid materials by hydrothermal treatment with a pore restructuring template. Chromatographically desirable morphologies (e.g., spherical particles and monoliths with a bimodal pore size distribution of macropores and mesopores) are preserved. In addition, materials can be further modified to enhance chromatographic properties.

The porous inorganic/organic hybrid materials with ordered domains and, advantageously, a chromatographically enhanced pore geometry, further have high surface areas, which consequently enhance the materials' retention capacity. The materials may also have novel mechanical and chemical properties due to the pore ordering in comparison to an amorphous analog.

Porous Hybrid Inorganic/Organic Materials

The invention makes use of well-formed mesoporous materials. Such materials are described in, e.g., U.S. Pat. No. 6,686,035, WO 03/014450 A1, U.S. Pat. No. 6,528,167 and WO 04/041398.

Thus, in one embodiment, the pore restructuring process of the invention provides porous hybrid inorganic/organic materials comprising ordered domains, wherein the materials generally have one of formula I, formula II, or formula III as follows:

$(A)_x(B)_y(C)_z$ 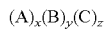 (Formula I)

wherein the order of repeat units A, B, and C may be random, block, or a combination of random and block;

A is an organic repeat unit which is covalently bonded to one or more repeat units A or B via an organic bond;
B is an organosiloxane repeat unit which is bonded to one or more repeat units B or C via an inorganic siloxane bond and which may be further bonded to one or more repeat units A or B via an organic bond;
C is an inorganic repeat unit which is bonded to one or more repeat units B or C via an inorganic bond; and
x, y are positive numbers and z is a non negative number, wherein
when z=0, then $0.002 \leq x/y \leq 210$, and when $z \neq 0$, then $0.0003 \leq y/z \leq 500$ and $0.002 \leq x/(y+z) \leq 210$;

$$(A)_x(B)_y(B^*)_{y^*}(C)_z \quad \text{(Formula II)}$$

wherein the order of repeat units A, B, B*, and C may be random, block, or a combination of random and block;
A is an organic repeat unit which is covalently bonded to one or more repeat units A or B via an organic bond;
B is an organosiloxane repeat units which is bonded to one or more repeat units B or B* or C via an inorganic siloxane bond and which may be further bonded to one or more repeat units A or B via an organic bond;
B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;
C is an inorganic repeat unit which is bonded to one or more repeat units B or B* or C via an inorganic bond; and
x, y are positive numbers and z is a non negative number, wherein
when z=0, then $0.002 \leq x/(y+y^*) \leq 210$, and when $z \neq 0$, then $0.0003 \leq (y+y^*)/z \leq 500$ and $0.002 \leq x/(y+y^*+z) \leq 210$; or $$[A]_y[B]_x \quad \text{(Formula III)},$$

wherein x and y are whole number integers and A is $$SiO_2/(R^1_p R^2_q SiO_t)_n \text{ or } SiO_2/[R^3(R^1_r SiO_t)_m]_n;$$

wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100;
B is:

$$SiO_2/(R^4_v SiO_t)_n$$

wherein $R^4$ is hydroxyl, fluorine, alkoxy, aryloxy, substituted siloxane, protein, peptide, carbohydrate, nucleic acid, or combinations thereof, $R^4$ is not $R^1$, $R^2$, or $R^3$; v is 1 or 2, provided that when v=1, t=1.5, and when v=2, t=1; and n is a number from 0.01 to 100;
wherein the material of formula III has an interior area and an exterior surface, and the interior area of the material has a composition represented by A; the exterior surface of the material has a composition represented by A and B, and wherein the exterior composition is between about 1 and about 99% of the composition of B and the remainder comprising A.

In one embodiment of the material of formula II, B is bonded to one or more repeat units B or C via an inorganic siloxane bond and is bonded to one or more repeat units A or B via an organic bond.

In one embodiment of the material of Formula I or Formula II, $0.003 \leq y/z \leq 50$ and $0.02 \leq x/(y+z) \leq 21$. In another embodiment, $0.03 \leq y/z \leq 5$ and $0.2 \leq x/(y+z) \leq 2.1$.

In yet another embodiment of the material of Formula I or Formula II, A is a substituted ethylene group, B is an oxysilyl-substituted alkylene group, and C is a oxysilyl group. In certain preferred embodiments, A is selected from the group consisting of

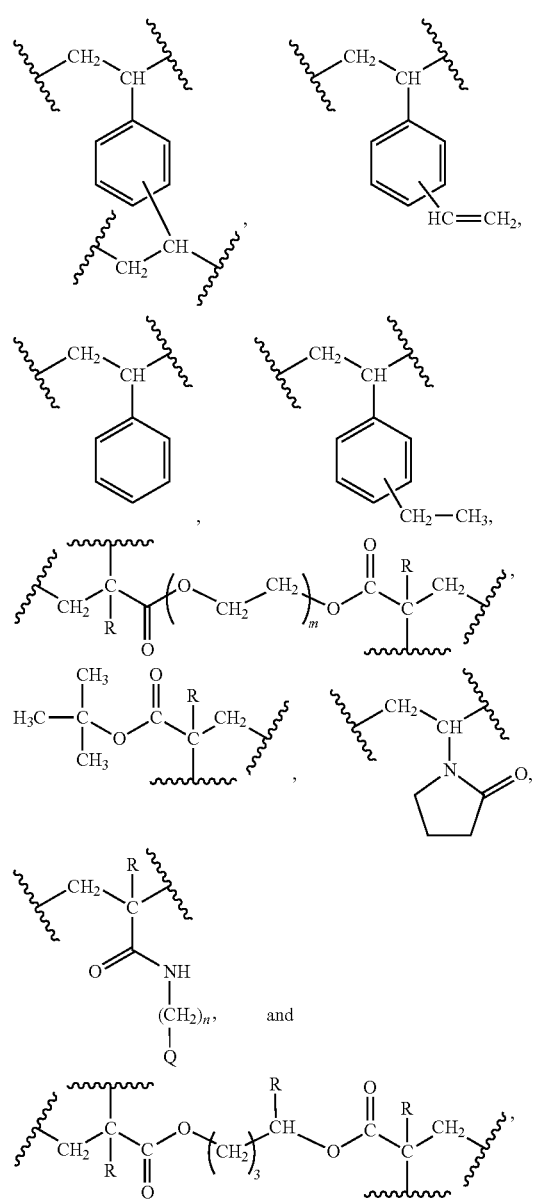

wherein each R is independently H or a $C_1$-$C_{10}$ alkyl group; m is an integer of from 1 to 20; n is an integer of from 0 to 10; and Q is hydrogen, $N(C_{1-6}alkyl)_3$, $N(C_{1-6}alkyl)_2(C_{1-6}alkylene-SO_3)$, or $C(C_{1-6}hydroxyalkyl)_3$. In certain embodiments, each R is independently hydrogen, methyl, ethyl, or propyl.

In certain embodiments of the materials of Formula I or Formula II, B is selected from the group consisting of

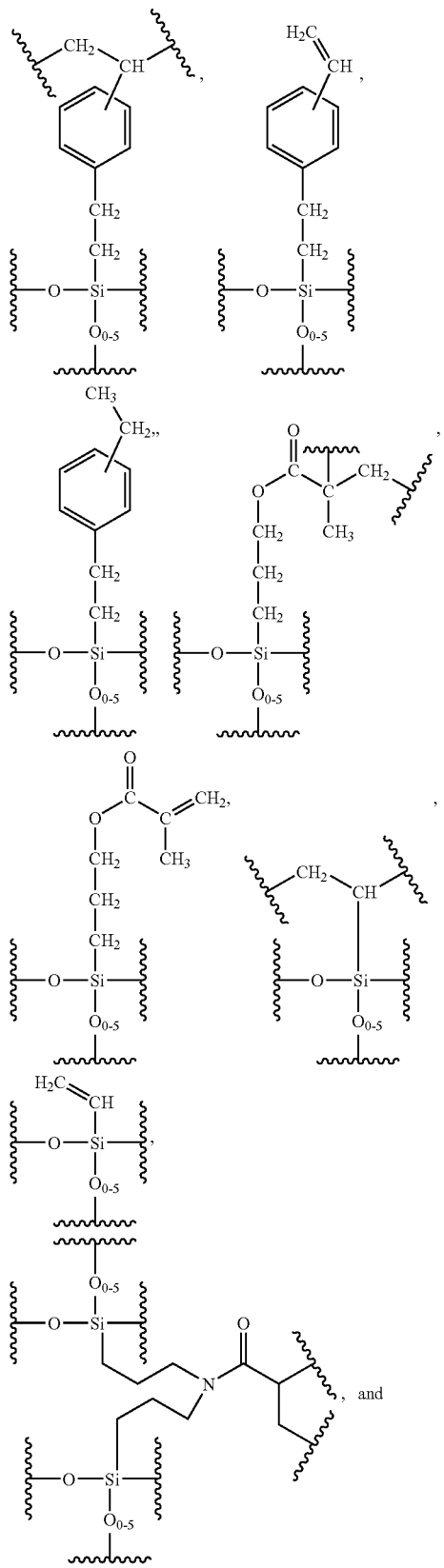

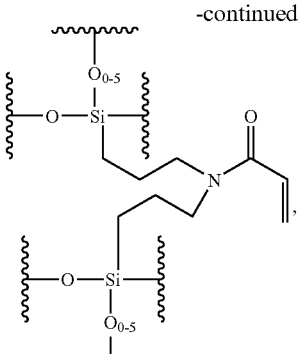

and wherein

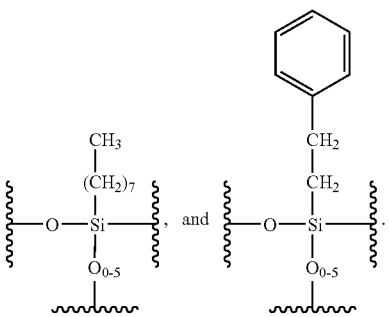

B* is selected from a group consisting of
In certain embodiments of the materials of Formula I or Formula II, C is

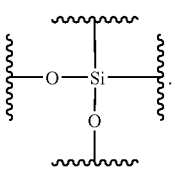 [SMILES: *O[Si](*)(*)O* ; "."]

In embodiments of the material of Formula III, the exterior surface has a composition that is between about 50 and about 90% of composition B, with the remainder comprising composition A. In certain preferred embodiments, the surface has a composition that is between about 70 and about 90% of composition B, with the remainder comprising composition A.

In various embodiments of the material of Formula III, $R^4$ is hydroxyl; $R^4$ is fluorine; $R^4$ is methoxy; or $R^4$ is —$OSi(R^5)_2$—$R^6$ wherein $R^5$ is a $C_1$ to $C_6$ straight, cyclic, or branched alkyl, aryl, or alkoxy group, a hydroxyl group, or a siloxane group, and $R^6$ is a $C_1$ to $C_{36}$ straight, cyclic, or branched alkyl, aryl, or alkoxy group, wherein $R^6$ is unsubstituted or substituted with one or more moieties selected from the group consisting of halogen, cyano, amino, diol, nitro, ether, carbonyl, epoxide, sulfonyl, cation exchanger, anion exchanger, carbamate, amide, urea, peptide, protein, carbohydrate, nucleic acid functionalities, and combinations thereof. In certain embodiments, $R^6$ is a $C_{18}$ group and in other embodiments, $R^6$ is a cyanopropyl group.

The hybrid materials having formula I or formula II are prepared as described in WO 04/041398, particularly Examples 1-9. In general, such hybrid materials are prepared by the steps of (a) hydrolytically condensing an alkenyl-functionalized organosilane with a tetraalkoxysilane, (b) copolymerizing the product of step (a) with an organic olefin monomer, and (c) further hydrolytically condensing the product of step (b) to thereby prepare a porous inorganic/organic homogenous copolymeric hybrid material. In this embodiment, steps (b) and (c) may be performed substantially simultaneously. Steps (a) and (b) may be performed in the same reaction vessel.

Alternatively, the materials are prepared by the steps of (a) copolymerizing an organic olefin monomer with an alkenyl-functionalized organosilane, and (b) hydrolytically condensing the product of step (a) with a tetraalkoxysilane in the presence of a non-optically active porogen to thereby prepare a porous inorganic/organic homogenous copolymeric hybrid material. Steps (a) and (b) may be performed in the same reaction vessel.

Also, the materials may be prepared by the steps of substantially simultaneously copolymerizing an organic monomer with an alkenyl-functionalized organosilane and hydrolytically condensing said alkenyl-functionalized organosilane with a tetraalkoxysilane to thereby prepare a porous inorganic/organic homogenous copolymeric hybrid material.

The copolymerizing step of the foregoing methods may be free radical-initiated and the hydrolytically condensing step of the foregoing methods may by acid- or base-catalyzed. Additionally, the reaction may be heated following the addition of the free radical polymerization initiator. A porogen may be used.

Hybrid materials of Formula III above are prepared as described in U.S. Pat. No. 6,528,167, in particular Examples 1-12. In general, the materials are prepared by a five-step process. In the first step, an organotrialkoxysilane such as methyltriethoxysilane, and a tetraalkoxysilane such as tetraethoxysilane (TEOS) are prepolymerized to form polyalkylalkoxysiloxane (PAS) by co-hydrolyzing a mixture of the two components in the presence of an acid catalyst. In the second step, the PAS is suspended in an aqueous medium in the presence of a surfactant and gelled into porous spherical particles of hybrid silica using a base catalyst. In the third step, the pore structure of the hybrid silica particles is modified by hydrothermal treatment, producing an intermediate hybrid silica product which may be used for particular purposes itself, or desirably may be further processed below. The above three steps of the process allow much better control of the particle morphology, pore volume and pore sizes than those described in the prior art, and thus provide the chromatographically-enhancing pore geometry. In a fourth step, one or more of the surface organo groups such as the methyl group are replaced with a hydroxyl, fluorine, alkoxy, or aryloxy group.

In the fifth step, the original and newly formed surface silanol groups of the hybrid silica may be further derivatized with organic functional groups, such as by reacting with a halopolyorganosilane such as octadecyldimethylchlorosilane. The surface coverage of the organo groups such as octadecyl groups is higher than in conventional hybrid-based packing materials, and subsequently the derivatized materials may have increased stability in low pH mobile phases.

In another embodiment, the invention provides porous hybrid inorganic/organic materials comprising ordered domains and having a chromatographically-enhancing pore geometry. Such materials are described in U.S. Pat. No. 6,686,035 and WO 03/014450 and have the formula $SiO_2/(R^2_pR^4_qSiO_t)_n$ or $SiO_2/[R^6(R^2_rSiO_t)_m]_n$ wherein $R^2$ and $R^4$ are independently $C_1$-$C_{18}$ aliphatic or aromatic moieties (which may additionally be substituted with alkyl, aryl, cyano, amino, hydroxyl, diol, nitro, ester, ion exchange or embedded polar functionalities), $R^6$ is a substituted or unsubstituted $C_1$-$C_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.5, more preferably, 0.1 to 1, and even more preferably 0.2 to 0.5. $R^2$ may be additionally substituted with a functionalizing group R (defined above). In one embodiment, n is a number from 0.03 to 1.5. In a preferred embodiment, n is a number from 0.2 to 0.5.

Porous inorganic/organic hybrid materials having ordered domains generally have a specific surface area, as measured by $N_2$ sorption analysis, of about 50 to 800 $m^2$/g, preferably about 100 to 700 $m^2$/g, more preferably about 300 to 600 $m^2$/g. The specific pore volume of the hybrid materials is generally about 0.25 to 1.5 $cm^3$/g, preferably about 0.4 to 1.4 $cm^3$/g, more preferably about 0.7 to 1.3 $cm^3$/g. The average pore diameter of the materials is generally about 50 to 500 Å, preferably about 50 to 400 Å, more preferably about 50 to 300 Å. Porous inorganic/organic hybrid materials having ordered domains and also having a chromatographically-enhancing pore geometry have a micropore surface area less than about 110 $m^2$/g, preferably less than about 105 $m^2$/g, more preferably less than about 80 $m^2$/g, and still more preferably less than about 50 $m^2$/g.

Porous inorganic/organic hybrid materials having pore ordered domains and chromatographically-enhancing pore geometry may be made as described below and in the specific instances illustrated in the Examples. In one embodiment, the porous inorganic/organic hybrid materials having pore ordered domains and chromatographically-enhancing pore geometry comprise porous spherical particles of hybrid silica.

Porous spherical particles of hybrid silica are prepared as described in U.S. Pat. No. 6,686,035. For example, porous spherical particles of hybrid silica may, in a preferred embodiment, be prepared by a multi-step process. In the first step, one or more organoalkoxysilanes such as methyltriethoxysilane, and a tetraalkoxysilane such as tetraethoxysilane (TEOS) are prepolymerized to form a polyorganoalkoxysiloxane (POS), e.g., polyalkylalkoxysiloxane, by co-hydrolyzing a mixture of the two or more components in the presence of an acid catalyst. In the second step, the POS is suspended in an aqueous medium in the presence of a surfactant or a combination of surfactants and gelled into porous spherical particles of hybrid silica using a base catalyst. In the third step, the pore structure of the hybrid silica particles is modified by hydrothermal treatment, producing an intermediate hybrid silica product which may be used for particular purposes itself, or desirably may be further processed below. The above three steps of the process allow much better control of the particle sphericity, morphology, pore volume and pore sizes than those described in the prior art, and thus provide the chromatographically-enhancing pore geometry.

In one embodiment, the surface organic groups of the hybrid silica are derivatized or modified in a subsequent step via formation of an organic covalent bond between the particle's organic group and the modifying reagent. Alternatively, the surface silanol groups of the hybrid silica are derivatized or modified into siloxane functional groups, such as by reacting with an organotrihalosilane, e.g., octadecyltrichlorosilane, or a halopolyorganosilane, e.g., octadecyldimethylchlorosilane.

Alternatively, the surface organic and silanol groups of the hybrid silica are both derivatized or modified. The surface of the thus-prepared material is then covered by the organic groups, e.g., alkyl, embedded during the gelation and the organic groups added during the derivatization process or processes. The surface coverage by the overall organic groups is higher than in conventional silica-based packing materials, and therefore the surface concentration of the remaining silanol groups in the hybrid silica is smaller.

Where the prepolymerization step involves co-hydrolyzing a mixture of the two or more components in the presence of an acid catalyst, the content of the organoalkoxysilane, e.g., organotrialkoxysilane can be varied, e.g., from about 0.03 to about 1.5 mole per mole, or more preferably, about 0.2 to about 0.5 mole per mole, of the tetraalkoxysilane. The amount of the water used for the hydrolysis can be varied, e.g., from 1.10 to 1.35 mole per mole of the silane. The silane, water and the ethanol mixture, in the form of a homogeneous solution, is stirred and heated to reflux under a flow of argon. After it is refluxed for a time sufficient to prepolymerize to form polyorganoalkoxysiloxane (POS), e.g., polyalkylalkoxysiloxane, the solvent and the side product, mainly ethanol, is distilled off from the reaction mixture. Thereafter, the residue is heated at an elevated temperature, e.g., in the range of 120 to 140° C. under an atmosphere of argon for a period of time, e.g., 1.5 to 16 h. The residue is further heated at this temperature, e.g., for 1 to 3 h under reduced pressure, e.g., $10^{-2}$-$10^{-3}$ torr, to remove any volatile species.

In the second step, the POS is suspended into fine beads in a solution containing water and ethanol at 55° C. by agitation. The volume percent of ethanol in the solution is varied from 10 to 20%. A non-ionic surfactant such as Triton X-100 or Triton X-45 is added into the suspension as the suspending agent. Alternatively a mixture of Triton X-45 and low levels of glycolic acid ethoxylate 4-tert-butylphenyl ether, sodium dodecyl sulfate (SDS) or tris(hydroxymethyl)aminomethane lauryl sulfate (TDS) is added into the suspension as the suspending agent.

The surfactants, e.g., alkylphenoxypolyethoxyethanol, are believed to be able to orient at the hydrophobic/hydrophilic interface between the POS beads and the aqueous phase to stabilize the POS beads. The surfactants are also believed to enhance the concentration of water and the base catalyst on the surface of the POS beads during the gelation step, through their hydrophilic groups, which induces the gelling of the POS beads from the surface towards the center. Use of surfactants to modulate the surface structure of the POS beads stabilizes the shape of the POS beads throughout the gelling process, and minimizes or suppresses formation of particles having an irregular shapes, e.g., "shell shaped", and inhomogeneous morphology.

It is also possible to suspend a solution containing POS and toluene in the aqueous phase, instead of POS alone. The toluene, which is insoluble in the aqueous phase, remains in the POS beads during the gelation step and functions as a porogen. By controlling the relative amount of toluene in the POS/toluene solution, the pore volume of the final hybrid silica can be more precisely controlled. This allows the preparation of hybrid silica particles having large pore volume, e.g., 0.7-1.3 cm$^3$/g.

The gelation step is initiated by adding the basic catalyst, e.g., ammonium hydroxide into the POS suspension agitated at 55° C. Thereafter, the reaction mixture is agitated at the same temperature to drive the reaction to completion. Ammonium hydroxide is preferred because bases such as sodium hydroxide are a source of unwanted cations, and ammonium hydroxide is easier to remove in the washing step. The thus-prepared hybrid silica is filtered and washed with water and methanol free of ammonium ions, then dried.

Another embodiment of the invention provides porous inorganic/organic hybrid monolith materials. Monolith materials are described, e.g., in WO 03/014450 and in WO 04/041389. The hybrid monolith materials of the invention may be indirectly prepared by coalescing the inorganic/organic hybrid particles prepared as described above, or may be directly prepared from inorganic and organic precursors. The hybrid monolith materials of the invention have a high surface coverage of organic groups and, in certain embodiments, a chromatographically-enhancing pore geometry. Furthermore, by incorporation of the organic moieties in the silica backbone, the hydrophobic properties of the hybrid monolith material, as is seen in the hybrid particles of the invention, can be tailored to impart significantly improved alkaline stability.

Porous inorganic/organic hybrid monolith materials may be made as described below. In a preferred embodiment, the porous spherical particles of hybrid silica of the invention may be used as prepared by the process noted above, without further modification. These hybrid particles are mixed with a second material, e.g., unbonded silica, and packed into a container, e.g., a column. After packing is complete, the mixture is coalesced, e.g., sintered, and the second material is subsequently removed by a washing step. The hybrid monolith material is further processed, e.g., rinsed with a solvent, to result in the hybrid monolith material.

Alternatively, the monolith material may be prepared directly by a sol-gel process. The general process for directly preparing an inorganic/organic hybrid monolith material in a single step from inorganic and organic precursors can be characterized by the following process.

First, a solution is prepared containing an aqueous acid, e.g., acetic, with a surfactant, an inorganic precursor, e.g., a tetraalkoxysilane, and an organic precursor, e.g., a organoalkoxysilane, e.g., organotrialkoxysilane. The range of acid concentration is from about 0.1 mM to 500 mM, more preferably from about 10 mM to 150 mM, and still more preferably from about 50 mM to 120 mM. The range of surfactant concentration is between about 3% and 15% by weight, more preferably between about 7 and 12% by weight, and still more preferably between about 8% to 10% by weight. Furthermore, the range of the total silane concentration, e.g., methyltrimethoxysilane and tetramethoxysilane, employed in the process is kept below about 5 g/mL, more preferably below 2 g/mL, and still more preferably below 1 g/mL.

The sol solution is then incubated at a controlled temperature, resulting in a three-dimensional gel having a continuous, interconnected pore structure. The incubation temperature range is between about the freezing point of the solution and 90° C., more preferably between about 20° C. and 70° C., still more preferably between about 35° C. and 60° C. The gel is aged at a controlled pH, preferably about pH 2-3, and temperature, preferably about 20-70° C., more preferably about 35 to 60° C., for about 5 hours to about 10 days, more preferably from about 10 hours to about 7 days, and still more preferably from about 2 days to about 5 days, to yield a solid monolith material.

In order to further gel the hybrid material and to remove surfactant, the monolith material is rinsed with an aqueous basic solution, e.g., ammonium hydroxide, at an temperature of about 0° C. to 80° C., more preferably between about 20° C. and 70° C., and still more preferably between about 40° C.

and 60° C. Additionally, in certain embodiments, the concentration of base is between about $10^{-5}$ N and 1 N, more preferably between about $10^{-4}$ N and 0.5 N, and still more preferably between about $10^{-3}$ N and 0.1 N. The monolith material is rinsed for about 1 to 6 days, more preferably for about 1.5 to 4.5 days, the still more preferably for about 2 to 3 days.

In addition, the monolith material may undergo hydrothermal treatment in a basic solution at an elevated temperature, e.g., in an autoclave, to improve the monolith material's pore structure. The preferred pH of the hydrothermal treatment is between about 7.0 and 12.0, more preferably between about 7.3 and 11.0, and still more preferably between about 7.5 and 10.6. The temperature of the hydrothermal treatment is between about 110° C. and 180° C., more preferably between about 120° C. and 160° C., and still more preferably between about 130° C. and 155° C. The monolith material is then rinsed with water followed by a solvent exchange with methanol, ethanol, acetonitrile, tetrahydrofuran, or hexane, and room temperature drying. The monolith material is then dried at about 70 to 120° C., and preferably at about 100° C. under vacuum for about 16-24 hours.

In a subsequent step, the surface organic groups of the hybrid monolith material, prepared directly or indirectly, are optionally derivatized or modified via formation of a covalent bond between the monolith material's organic and/or silanol group and the modifying reagent, optionally including coating with a polymer, as is described for the hybrid particles.

The as-prepared hybrid materials of the invention can be modified in a variety of ways to enhance their chromatographic performance. In one embodiment, the pore structure of the as-prepared hybrid material is modified by hydrothermal treatment, which enlarges the openings of the pores as well as the pore diameters, as confirmed by nitrogen ($N_2$) sorption analysis, thereby providing a hybrid material with a chromatographically-enhancing pore geometry. The hydrothermal treatment is performed by preparing a slurry containing the as-prepared hybrid material and a solution of organic base in water, heating the slurry in an autoclave at an elevated temperature, e.g., about 143 to 168° C., for a period of about 6 to 28 h. The pH of the slurry can be adjusted to be in the range of about 8.0 to 10.7 using concentrated acetic acid. The concentration of the slurry is in the range of about 1 g hybrid material per 5 to 10 mL of the base solution. The thus-treated hybrid material is filtered, and washed with water until the pH of the filtrate reaches about 7, washed with acetone, then dried at about 100° C. under reduced pressure for about 16 h. The resultant hybrid materials show average pore diameters in the range of about 100-300 Å. The pores of the hydrothermally treated hybrid material may be restructured in a similar fashion to that of the hybrid material that is not modified by hydrothermal treatment as described in the present invention.

Moreover, the surface of the hydrothermally treated hybrid silica contains organic groups, which can be derivatized by reacting with a reagent that is reactive towards the hybrid materials' organic group. For example, vinyl groups on the material can be reacted with a variety of olefin reactive reagents such as bromine ($Br_2$), hydrogen ($H_2$), free radicals, propagating polymer radical centers, dienes, and the like. In another example, hydroxyl groups on the material can be reacted with a variety of alcohol reactive reagents such as isocyanates, carboxylic acids, carboxylic acid chlorides, and reactive organosilanes as described below. Reactions of this type are well known in the literature, see, e.g., March, J. "Advanced Organic Chemistry," 3$^{rd}$ Edition, Wiley, New York, 1985; Odian, G. "The Principles of Polymerization," 2$^{nd}$ Edition, Wiley, New York, 1981; the texts of which are incorporated herein by reference.

In addition, the surface of the hydrothermally treated hybrid silica also contains silanol groups, which can be derivatized by reacting with a reactive organosilane. The surface derivatization of the hybrid silica is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at about 80° C. to 100° C. under reduced pressure for about 16 h. The resultant hybrid silica can be further reacted with a short-chain silane such as trimethylchlorosilane or hexamethyldisilazane to endcap the remaining silanol groups, by using a similar procedure described above.

More generally, the surface of the hybrid silica materials may be surface modified with a surface modifier, e.g., $Z_a(R')_b Si-R$, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl. The functionalizing group R may include alkyl, alkenyl, alkynyl, aryl, cyano, amino, diol, nitro, cation or anion exchange groups, or alkyl or aryl groups with embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference and as detailed hereinabove. In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. Advantageously, R is octyl or octadecyl.

The surface of the hybrid silica materials may also be surface modified by coating with a polymer. Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III), and chemisorption of presynthesized polymers onto the surface of the support (type IV). see, e.g., Hanson et al., *J. Chromat.* A656 (1993) 369-380, the text of which is incorporated herein by reference. As noted above, coating the hybrid material with a polymer may be used in conjunction with various surface modifications described in the invention. In a preferred embodiment, Sylgard® is used as the polymer. The pores of the surface modified hybrid materials may be restructured in a similar fashion to that of the hybrid material that is not modified by hydrothermal treatment as described in accordance with the present invention.

Pore Restructuring to Provide Ordered Domains

The porous inorganic/organic hybrid materials, prepared as described above, are further processed to provide materials with ordered domains. Ordered domains are produced in these mesoporous hybrid materials by base-catalyzed transformation. In accordance with the process, a variety of pore templating molecules, optionally in combination with template swelling molecules, can be used to form pore restructuring templates, with a variety of mesoporous hybrid materials. The process of the invention makes use of mesopore restructuring protocols (e.g., pore templating molecule choice, solution composition, template swelling molecule choice, temperature and time) that have been used for the restructuring of porous inorganic materials (i.e. silica gel). (T. Martin, A. Galarneau, F. Di Renzo, F. Fajula, D. Plee, *Angew. Chem. Int. Ed.* 41 (2002) 2590.)

Although similar uniform pore networks ("ordered domains") have been reported (M. Grün, K. K. Unger, A. Matsumoto, K. Tsutsumi, *Microporous and Mesoporous Materials* 27 (1999) 207; A. Firouzi, D. Kumar, L. M. Bull, T. Besier, P. Sieger, Q. Huo, S. A. Walker, J. A. Zasadzinski, C. Glinka, J. Nicol, D. Margolese, G. D. Stucky, B. F. Chmelka, *Science,* 267 (1995) 1138; M. Etienne, B. Lebeau, A. Walcarius, *New. J. Chem.* 26 (2002) 384) for directly synthesized hexagonal (e.g., MCM-41), cubic (e.g., MCM-48) and lamellar (e.g., MCM-50) materials without chromatographically enhanced pore geometries, the pore restructuring process according to the invention differs from these processes in that the hybrid matrix is not prepared directly from siloxane monomers or small particle units (e.g., silica sols or tetraethoxysilane) but rather from well-formed mesoporous hybrid materials, such as those described above.

The process of the invention is advantageous because it does not significantly alter the morphology of the hybrid materials. For example, when highly spherical hybrid materials ($d_p$=5 µm) are used in the process of the invention, the pore transformed product is comprised of spherical materials with a particle size close to that of the starting materials (i.e., 5 µm). Materials, including both spherical and non-spherical particles, produced in accordance with the process of the invention can be prepared in sizes ranging from about 0.1 to about 60 µm.

By controlling the reaction conditions (e.g., pore templating molecule choice, solution composition, template swelling molecule choice, temperature and time), the pore profiles of the porous hybrid materials produced in accordance with the invention can be manipulated. Materials prepared in accordance with the invention have high specific surface areas and have greatly reduced microporosity as compared to materials presently used in high performance chromatographic applications. They further have crystalline domains or regions.

In accordance with the pore restructuring process of the invention, a porous hybrid inorganic/organic material comprising ordered domains is prepared by (a) forming a pore restructuring template comprising a pore templating molecule;

(b) restructuring the pores of a porous hybrid inorganic/organic material by contacting the pores of the porous hybrid inorganic/organic material with the pore restructuring template, to thereby restructure the pores into ordered domains; and (c) removing the template from the restructured pores; to thereby prepare a porous hybrid inorganic/organic material comprising ordered domains.

In one embodiment, the restructuring template is formed by using the templating molecule at a concentration above its critical micelle concentration (CMC), optionally in combination with a template swelling molecule. This results in the formation of micelles, vesicles, or networks of a variety of shapes, sizes and orders, of the pore templating molecule, e.g., hexagonally close packed networks, as shown in FIG. 1.

Pore templating molecules may be ionic or non-ionic and include a number of surfactants. Examples of non-ionic pore templating molecules include but are not limited to polymers and block copolymers, e.g. poly(ethyleneoxide)-poly(propyleneoxide)-poly(ethyleneoxide), e.g., Pluronic® P123, Pluronic® P64, Pluronic P105, poly(ethyleneoxide)-alkyl ethers, e.g., Brij® 76, Brij® 30, Tween®, Span®, Triton®, Ipagel®. Ionic pore templating molecules include but are not limited to cationic, anionic, and zwitterionic molecules. The ionic pore templating molecules may further be divalent or multivalent as well as be amphiphilic or gemini in structure. Examples of ionic pore templating molecules include sodium bis(2-ethylhexyl)sulfosuccinate, glycolic acid ethoxylate 4-tert-butylphenyl ether, glycolic acid ethoxylate lauryl ether, glycolic acid ethoxylate 4-nonylphenyl ether, glycolic acid ethoxylate octyl ether, glycolic acid ethoxylate oleyl ether, sodium dodecyl sulfate (SDS) or tris(hydroxymethyl)aminomethane lauryl sulfate (TDS), ammonium lauryl sulfate, alkyltrimethylammonium halides, e.g., cetyltrimethylammonium chloride, cetyltrimethylammonium bromide, trimethylstearylammonium chloride. One or a combination of two or more pore templating molecules can be used. The pore templating molecules are advantageously used above their critical micelle concentrations (CMC) when the CMC exists.

Template swelling molecules include, e.g., benzene, toluene, cyclohexane, cyclohexanol, dodecanol, chlorododecane, 1,3,5-trimethylbenzene, and 1,3,5-triisopropylbenzene. In preferred embodiments, the template swelling molecule is 1,3,5-trimethylbenzene or 1,3,5-triisopropylbenzene.

The pores of the porous hybrid inorganic/organic material are restructured by contacting the porous hybrid inorganic/organic material under hydrothermal conditions in the presence of the pore restructuring template. In a preferred embodiment, restructuring is made by filling the pores with the pore restructuring template. The pores are filled by admixing the porous hybrid inorganic/organic material with an aqueous base and the pore restructuring template. The base can be any Lewis base including, for example, ammonium hydroxide, hydroxide salts of the group I and group II metals, carbonate and hydrogencarbonate salts of the group I metals, or alkoxide salts of the group I and group II metals, and alkylamines (e.g., tris(hydroxymethyl)aminomethane, tetraethylammonium hydroxide). In a preferred embodiment, the base is sodium hydroxide (NaOH).

Figure 2:
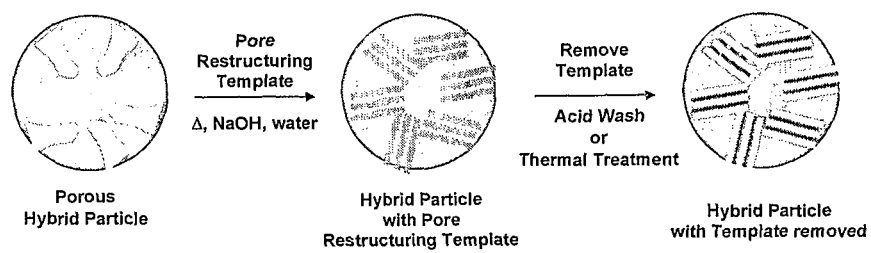
FIG. 2 shows particle pore transformation from amorphous to ordered domain using the process of the invention.

The pore templating molecule works its way into the pores of the hybrid material via a hybrid silicate dissolution/precipitation process as exemplified in FIG. 2. At this point in the process, the pores of the hybrid material are filled with the ordered pore-templating micelle bundles. The bundles restructure the pores into ordered domains.

To complete the pore restructuring process, the admixture of the porous hybrid inorganic/organic material, the aqueous mixture containing the base and the pore templating molecule is heated at a temperature and for a period of time sufficient to form ordered domains. Typically, heating temperatures range from about 25 to about 200° C., more preferably 80 to about 150° C., and most preferably from about 100 to about 130° C. Time periods for heating range from about 1 to about 120 hours, more preferably 7 to about 120 hours, and most preferably from about 20 to about 48 hours.

In the final step of the pore ordering process, the pore restructuring template is removed. In one embodiment, removal is achieved by extraction using an acid wash. Acids that may be used include hydrochloric acid, hydrobromic acid, hydrofluoric acid, hydroiodic acid, sulfuric acid, formic acid, acetic acid, trichloroacetic acid, trifluoroacetic acid, or phosphoric acid. Water soluble solvents that may be used include acetonitrile, tetrahydrofuran, dimethylsulfoxide, dimethylformamide, methanol, ethanol, and isopropanol. In a preferred embodiment, a wash comprising concentrated hydrochloric acid and ethanol is used. The suspension of the material in the wash is heated to about 25 to about 100° C., more preferably from 40 to about 60° C., and most preferably 50° C. for about 1 to about 30 hours, more preferably from 4 to about 25 hours, and most preferably 20 hours.

In another embodiment, the pore restructuring template is removed by thermal treatment; i.e., by heating at a temperature ranging from about 250 to about 600° C., more preferably from 275 to about 350° C., and most preferably 300° C. for a period of time ranging from 1 to about 30 hours, more preferably from 4 to about 25 hours, and most preferably 16 hours. In a preferred embodiment, the as-processed material is placed in a suitable container, e.g., a stainless steel tube under a dynamic purge of either air, nitrogen, and/or argon and heated to a temperature of about 250-550° C. for 16 hours after an initial hold at about 100° C. for 40 minutes.

In yet another embodiment, the pore restructuring template is removed by ozonolysis treatment where the ozone degrades the surfactants into more easily removed by-products. See, e.g. T. Clark, Jr., J. D. Ruiz, H. Fan, C. J. Brinker, B. I. Swanson, A. N. Parikh *Chem. Mater.* 12 (2000) 3879 and A. Gieldowska-Bulska, J. Perkowskil, and L. Kos *Ozone: Science and Engineering*, 26 (2004) 217.

In certain embodiments, porous hybrid inorganic/organic materials already possessing a chromatographically-enhancing pore geometry are subjected to the pore restructuring process as described above to obtain porous hybrid inorganic/organic materials having a chromatographically-enhancing pore geometry and comprising ordered domains. In other embodiments, the pores of porous hybrid inorganic/organic materials lacking a chromatographically-enhancing pore geometry are restructured as described above to obtain porous hybrid inorganic/organic materials comprising a chromatographically-enhancing pore geometry as well as ordered domains. In other words, the pore restructuring process not only creates ordered domains but also creates a chromatographically-enhancing pore geometry. In still other embodiments, porous hybrid inorganic/organic materials already possessing a chromatographically-enhancing pore geometry are surface modified as described above followed by pore restructuring to provide surface modified porous hybrid inorganic/organic materials comprising ordered domains and having a chromatographically-enhancing pore geometry. These various embodiments are illustrated in Scheme 1 below.

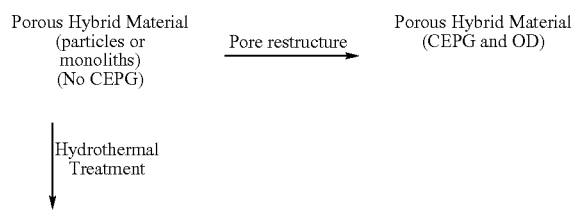

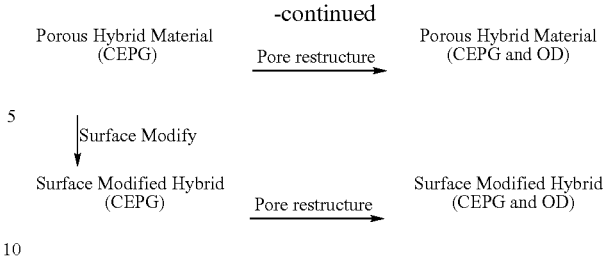

EXAMPLES

The present invention may be further illustrated by the following non-limiting examples describing the preparation of porous inorganic/organic hybrid materials with ordered domains, and their use.

Materials

All reagents were used as received unless otherwise noted. Those skilled in the art will recognize that equivalents of the following supplies and suppliers exist, and as such the suppliers listed below are not to be construed as limiting.

Characterization

Those skilled in the art will recognize that equivalents of the following instruments and suppliers exist, and as such the instruments listed below are not to be construed as limiting.

Median macropore diameter (MPD) and macropore volume (MPV) were measured by Mercury Porosimetry (Micromeritics AutoPore II 9220 or AutoPore IV, Micromeritics, Norcross, Ga.). The % C, % H, and % N values were measured by combustion analysis (CE-440 Elemental Analyzer; Exeter Analytical Inc., North Chelmsford, Mass.). The specific surface areas (SSA), specific pore volumes (SPV) and the average pore diameters (APD) of these materials were measured using the multi-point $N_2$ sorption method (Micromeritics ASAP 2400; Micromeritics Instruments Inc., Norcross, Ga.). The specific surface area was calculated using the BET method, the specific pore volume was the single point value determined for $P/P_0 > 0.98$, and the average pore diameter was calculated from the desorption leg of the isotherm using the BJH method. The micropore surface area (MPA), which is defined as the surface area in pores with diameters less than or equal to 34 Å, was also determined from the adsorption leg of the isotherm using the BJH method. Particle sizes were measured using a Beckman Coulter Multisizer 3 analyzer (30-μm aperture, 70,000 counts). The particle diameter (dp) was measured as the 50% cumulative volume diameter of the volume based particle size distribution. The width of the distribution was measured as the 90% cumulative volume diameter divided by the 10% cumulative volume diameter (90/10).

Example 1

Porous inorganic/organic hybrid particles comprising unbonded and $C_{18}$ bonded particles were synthesized as described in U.S. Pat. No. 6,686,035. The example from U.S. Pat. No. 6,686,035 which was followed to achieve the present material is indicated in Table 1 under the heading '035 Ref. Characterization data is listed in Table 1. For example 1e, the particle of type 1b was further modified with octadecyltrichlorosilane as described in U.S. Pat. No. 6,686,035, Example 25.

TABLE 1

| Product | Composition of Hybrid Material Prior to Modification | '035 Ref. | dp (μm) | 90/10 | SSA (m²/g) | SPV (cm³/g) | APD (Å) |
|---|---|---|---|---|---|---|---|
| 1a | $SiO_2/[C_2H_4(SiO_{1.5})_2]_{0.25}$ | 3 | 4.76 | 1.47 | 191 | 0.78 | 151 |
| 1b | $SiO_2/(CH_3SiO_{1.5})_{0.5}$ | 3 | 5.86 | 2.09 | 174 | 0.69 | 136 |
| 1c | $SiO_2/[C_2H_4(SiO_{1.5})_2]_{0.25}$ | 2 | 4.09 | 5.13 | 602 | 0.78 | 47 |
| 1d | $SiO_2/[C_2H_4(SiO_{1.5})_2]_{0.25}$ | 2 | 5.12 | 9.31 | 614 | 0.57 | 37 |
| 1e | $SiO_2/[C_2H_4(SiO_{1.5})_2]_{0.25}$—($C_{18}$) | 25 | 4.79 | 1.48 | 119 | 0.49 | 126 |

Example 2

Porous unbonded hybrid inorganic/organic particles 1a and 1b having a chromatographically-enhancing pore geometry were added to an aqueous solution containing sodium hydroxide (Aldrich Chemical, Milwaukee, Wis.) and one or more of the following pore templating molecules (PTM): cetyltrimethylammonium bromide ($C_{16}$-TAB, Aldrich Chemical), trimethylstearylammonium chloride ($C_{18}$-TAC, TCI America, Portland, Oreg.), cetyltrimethylammonium chloride ($C_{16}$-TAC, 25 wt % in water, Aldrich Chemical); the following template swelling molecules (TSM): 1,3,5-trimethylbenzene (TMB, Aldrich Chemical), yielding a suspension. The resultant suspension was mixed for 0.5 hours and was then enclosed in a stainless steel autoclave and heated to between 115° C. and 150° C. for 24-118 hours. After the autoclave cooled to room temperature the product was filtered and washed repeatedly using water and methanol (HPLC grade, J.T. Baker, Phillipsburgh, N.J.), and then dried at 80° C. under vacuum for 16 hours. Specific reagent amounts, reaction conditions, and characterization data are listed are listed in Table 2.

Example 3

Porous unbonded hybrid inorganic/organic particles 1c and 1d lacking a chromatographically-enhancing pore geometry were added to an aqueous solution containing sodium hydroxide (Aldrich Chemical, Milwaukee, Wis.) and one or more of the following pore templating molecules (PTM): cetyltrimethylammonium bromide ($C_{16}$-TAB, Aldrich Chemical), trimethylstearylammonium chloride ($C_{18}$-TAC, TCI America, Portland, Oreg.), cetyltrimethylammonium chloride ($C_{16}$-TAC, 25 wt % in water, Aldrich Chemical), Brij® 76 (Aldrich Chemical), Pluronic® P123 (Aldrich Chemical); and one or more of the following template swelling molecules (TSM): 1,3,5-trimethylbenzene (TMB, Aldrich Chemical), 1,3,5-triisopropylbenzene (TIP, Aldrich Chemical) yielding a suspension. The resultant suspension was mixed for 0.5 hours and was then enclosed in a stainless steel autoclave and heated to between 115° C. and 150° C. for 24-118 hours. After the autoclave cooled to room temperature the product was filtered and washed repeatedly with water and then methanol (HPLC grade, J.T. Baker, Phillipsburgh, N.J.), and then dried at 80° C. under vacuum for 16 hours. Specific reagent amounts, reaction conditions, and characterization data are listed in Table 3.

Example 4

Octadecyltrichlorosilane $C_{18}$ bonded hybrid particles having a chromatographically-enhancing pore geometry (1e) were added to an aqueous solution containing sodium hydroxide (Aldrich Chemical, Milwaukee, Wis.), anhydrous alcohol (HPLC grade, J.T. Baker, Phillipsburgh, N.J.), and one or more of the following pore templating molecules (PTM): cetyltrimethylammonium bromide ($C_{16}$-TAB, Aldrich Chemical), trimethylstearylammonium chloride ($C_{18}$-TAC, TCI America, Portland, Oreg.), cetyltrimethylammonium chloride ($C_{16}$-TAC, 25 wt % in water, Aldrich Chemical), yielding a suspension. The resultant suspension was mixed for 0.5 hours and was then enclosed in a stainless steel autoclave and heated to between 115° C. and 150° C. for 24-118 hours. After the autoclave cooled to room temperature the product was filtered and washed repeatedly using water and then methanol (HPLC grade, J.T. Baker), and then dried at 80° C. under vacuum for 16 hours. Specific reagent amounts, reaction conditions, and characterization data are listed in Table 4.

TABLE 2

| Product | Particle Reagent | Particle (g) | PTM | PTM (g) | Water (g) | NaOH (g) | TMB (g) | pH | Temp (° C.) | Time (h) | % C | % H | % N | SSA (m²/g) | SPV (cm³/g) | APD (Å) | MPV (cm³/g) |
|---|---|---|---|---|---|---|---|---|---|---|---|---|---|---|---|---|---|
| 2a | 1a | 15.0 | C16-TAB | 8.81 | 87.0 | 2.42 | 0 | 12.2 | 115 | 24 | 16.99 | 3.38 | 0.59 | 224 | 0.81 | 125 | — |
| 2b | 1a | 15.0 | C16-TAB | 8.81 | 87.0 | 2.42 | 0 | 12.1 | 115 | 118 | 16.50 | 3.37 | 0.56 | 216 | 0.83 | 133 | — |
| 2c | 1a | 15.0 | C18-TAC | 8.41 | 87.0 | 2.42 | 0 | 13.0 | 150 | 24 | 19.48 | 3.86 | 0.55 | 148 | 0.77 | 175 | — |
| 2d | 1a | 15.0 | C18-TAC | 8.41 | 87.0 | 2.42 | 13.0 | 12.7 | 115 | 24 | 20.63 | 4.12 | 0.70 | — | — | — | 0.61 |
| 2e | 1b | 15.0 | C16-TAC | 7.69 | 86.5 | 2.40 | 0 | 11.6 | 115 | 24 | 17.80 | 3.86 | 0.60 | 104 | 0.55 | 151 | — |
| 2f | 1b | 15.0 | C18-TAC | 8.36 | 86.5 | 2.40 | 13.0 | 12.5 | 115 | 24 | 24.36 | 5.15 | 0.87 | 118 | 0.35 | 75 | — |

TABLE 3

| Product | Particle Reagent | Particle (g) | PTM | PTM (g) | Water (g) | NaOH (g) | TSM (mass, g) | pH | Temp (° C.) | Time (h) | % C | % H | % N | SSA (m²/g) | SPV (cm³/g) | APD (Å) | MPV (cm³/g) |
|---|---|---|---|---|---|---|---|---|---|---|---|---|---|---|---|---|---|
| 3a | 1c | 15 | C18-TAC | 8.41 | 87.0 | 2.42 | 0 | 12.5 | 115 | 24 | 26.98 | 5.4 | 1.1 | 336 | 0.48 | 36 | — |
| 3b | 1c | 30 | C18-TAC | 8.41 | 87.0 | 4.83 | 0 | 12.6 | 115 | 24 | 24.0 | 4.77 | 0.89 | — | — | — | 0.41 |
| 3c | 1c | 15 | C18-TAC | 8.41 | 87.0 | 2.42 | 0 | 12.6 | 115 | 118 | 27.8 | 5.45 | 1.07 | — | — | — | 0.62 |

TABLE 3-continued

| Product | Particle Reagent | Particle (g) | PTM | PTM (g) | Water (g) | NaOH (g) | TSM (mass, g) | pH | Temp (°C.) | Time (h) | % C | % H | % N | SSA (m²/g) | SPV (cm³/g) | APD (Å) | MPV (cm³/g) |
|---|---|---|---|---|---|---|---|---|---|---|---|---|---|---|---|---|---|
| 3d | 1d | 15 | C18-TAC | 8.41 | 87.0 | 2.42 | 0 | 12.8 | 115 | 24 | 26.93 | 5.30 | 0.99 | — | — | — | 0.23 |
| 3e | 1d | 15 | C18-TAC | 8.41 | 87.0 | 2.42 | TMB (6.5) | 12.8 | 115 | 24 | 27.77 | 5.43 | 1.17 | — | — | — | 0.31 |
| 3f | 1d | 15 | C18-TAC | 8.41 | 87.0 | 2.42 | TMB (13.0) | 12.8 | 115 | 24 | 27.69 | 5.46 | 1.16 | — | — | — | 0.34 |
| 3g | 1d | 15 | C18-TAC | 8.41 | 87.0 | 2.42 | TMB (6.5) | 12.4 | 115 | 24 | 26.95 | 5.37 | 1.09 | — | — | — | 0.32 |
| 3h | 1d | 15 | C18-TAC | 8.41 | 87.0 | 2.42 | TMB (13.0) | 12.7 | 115 | 24 | 28.63 | 5.67 | 1.13 | — | — | — | 0.33 |
| 3i | 1d | 15 | C18-TAC | 8.41 | 87.0 | 2.42 | TMB (18.0) | 12.7 | 115 | 24 | 28.25 | 5.63 | 1.03 | — | — | — | 0.43 |
| 3j | 1d | 15 | C18-TAC | 8.41 | 87.0 | 2.42 | TMB (6.5), TIB (6.5) | 12.7 | 115 | 24 | 28.38 | 5.69 | 1.01 | — | — | — | 0.34 |
| 3k | 1d | 15 | C18-TAC | 8.41 | 87.0 | 2.42 | TIB (12.9) | 12.8 | 115 | 24 | 29.32 | 5.72 | 1.02 | — | — | — | 0.27 |
| 3l | 1d | 15 | Brij-76 | 6.49 | 89.3 | 1.13 | 0 | 12.6 | 115 | 24 | 8.94 | 1.94 | 0.00 | — | — | — | 0.61 |
| 3m | 1d | 7 | Pluronic P123 | 5.10 | 89.0 | 1.13 | 0 | 12.2 | 115 | 24 | 7.60 | 1.62 | 0.00 | — | — | — | 0.63 |
| 3n | 1d | 15 | C18-TAC | 8.41 | 87.0 | 2.42 | TMB (13.0) | 12.6 | 115 | 24 | 26.17. | 5.25 | 1.01 | — | — | — | 0.42 |
| 3o | 1d | 15 | C18-TAC | 8.41 | 87.0 | 2.42 | TMB (13.0)) | 12.1 | 115 | 24 | 27.66 | 5.42 | 1.10 | — | — | — | 0.32 |
| 3p | 1d | 15 | C18-TAC | 8.41 | 87.0 | 2.42 | TMB (13.0) | 11.3 | 115 | 24 | 27.54 | 5.37 | 1.08 | — | — | — | 0.34 |
| 3q | 1d | 5.2 | C18-TAC | 2.91 | 30.2 | 0.84 | TMB (6.2) | 12.9 | 115 | 24 | 23.95 | 4.76 | 0.86 | — | — | — | 0.16 |

TABLE 4

| Product | Particle Reagent | Particle (g) | PTM | PTM (g) | Water (g) | Alcohol (g) | NaOH (g) | pH | Temp (°C.) | % C | % H | % N | SSA (m²/g) | SPV (cm³/g) | APD (Å) |
|---|---|---|---|---|---|---|---|---|---|---|---|---|---|---|---|
| 4a | 1e | 15 | C18-TAC | 8.41 | 86.96 | 0 | 2.42 | 12.9 | 150 | 27.24 | 5.15 | 0.47 | 101 | 0.54 | 174 |
| 4b | 1e | 15 | C18-TAC | 8.41 | 86.96 | 22.6 | 2.42 | 12.7 | 150 | 24.95 | 4.74 | 0.23 | 72 | 0.62 | 266 |

Example 5

Figure 3:
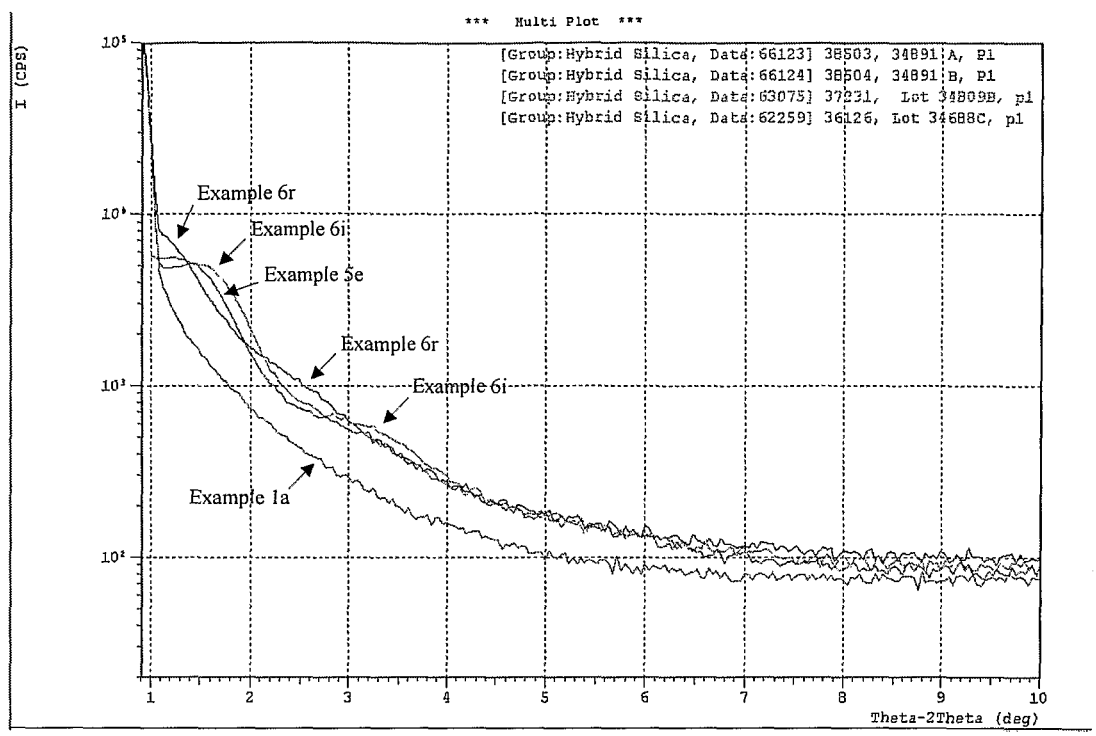
FIG. 3 shows XRPD overlaid patterns displayed by hybrid materials 6r, 6i, and 5e with ordered domains (full logarithmic scale) as measured by Method A of Example 9.

Selected samples of hybrid material prepared according to Examples 2, 3, and 4 were mixed in a solution containing the following: anhydrous ethanol (HPLC grade, J. T. Baker, Phillipsburgh, N.J.) and concentrated hydrochloric acid (Aldrich Chemical, Milwaukee, Wis.), and stirred in a 5 L round bottom flask. The suspension was then heated to 50° C. for 20 hours. After the reaction cooled to room temperature the product was filtered and washed repeatedly with water. This reaction was then repeated (50° C., 20 hours). Final product was washed with acetone and then dried at 80° C. under reduced pressure for 16 hours. Specific reagent amounts, reaction conditions, and characterization data are listed in Table 5. The XRPD plot for Example 5e is shown in FIG. 3, and a peak maximum is listed in table 9.

Example 6

Figure 4:
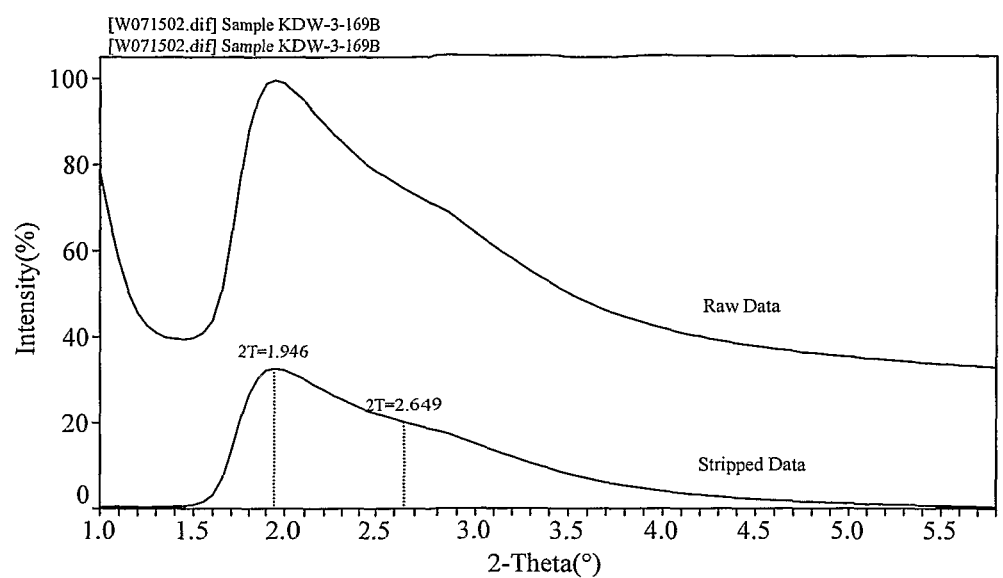
FIG. 4 shows an XRPD pattern displayed by hybrid material 6t with ordered domains (100% intensity scale) as measured by Method B of Example 9.

Selected samples of hybrid materials prepared according to Examples 2 and 3 were heated in a furnace (Model F6000, Barnstead/Thermolyne, Dubuque, Iowa) or within a stainless steel tube (19×50 mm) under a dynamic purge of either air or argon at 250-550° C. for 16 hours, after an initial hold at 100° C. for 40 minutes. Specific reaction conditions and characterization data are listed in Table 6. Selected materials were tested by XRPD, and peak maxima are listed in table 9. Exemplary plots for Examples 6r and 6i are shown in FIG. 3. An exemplary plot of Example 6t is shown in FIG. 4.

TABLE 5

| Product | Particle Reagent | Particle (g) | HCl (g) | Alcohol (L) | % C | % H | % N | SSA (m²/g) | SPV (cm³/g) | APD (Å) | MPA (m²/g) |
|---|---|---|---|---|---|---|---|---|---|---|---|
| 5a | 2a | 8.6 | 24.1 | 1.29 | 7.97 | 1.66 | 0.00 | 374 | 1.06 | 112 | 96 |
| 5b | 2b | 10.0 | 28.0 | 1.50 | 7.68 | 1.74 | 0.00 | 344 | 1.09 | 118 | 94 |
| 5c | 2e | 10.0 | 28.0 | 1.50 | 8.00 | 2.1 | 0.00 | 421 | 1.22 | 156 | 105 |
| 5d | 3a | 10.0 | 28.0 | 1.50 | 8.27 | 1.79 | 0.00 | 710 | 1.11 | 41 | 28 |
| 5e | 3b | 23 | 64.4 | 3.45 | 8.37 | 1.81 | 0.00 | 552 | 1.01 | 55 | 19 |
| 5f | 3c | 7.0 | 19.6 | 1.05 | 8.73 | 1.96 | 0.05 | 670 | 1.09 | 42 | 56 |
| 5g | 4b | 9.0 | 25.2 | 1.35 | 21.09 | 3.95 | 0.05 | 102 | 0.74 | 257 | 12 |
| 5h | 2c | 5.0 | 14.0 | 0.75 | 7.79 | 1.72 | 0.03 | 296 | 1.08 | 132 | 73 |

TABLE 6

| Product | Particle | Particle | Gas | Method | Temp | Product | % C | % H | % N | SSA | SPV | APD | MPA |
|---|---|---|---|---|---|---|---|---|---|---|---|---|---|
| 6a | 2c | 1.00 | air | oven | 250 | 0.70 | 8.24 | 1.40 | 0.00 | 292 | 1.04 | 141 | 62 |
| 6b | 2c | 1.00 | air | oven | 350 | 0.60 | 5.73 | 1.18 | 0.00 | 300 | 1.08 | 138 | 40 |
| 6c | 2c | 1.00 | air | oven | 550 | 0.90 | 0.61 | 0.15 | 0.00 | 254 | 0.93 | 138 | 67 |
| 6d | 2c | 1.00 | argon | oven | 250 | 0.80 | 8.58 | 1.47 | 0.00 | 283 | 1.04 | 144 | 54 |
| 6e | 2c | 1.00 | argon | tube | 275 | 0.70 | 8.54 | 1.74 | 0.00 | 292 | 1.07 | 135 | 76 |
| 6f | 2c | 1.00 | argon | tube | 375 | 0.70 | 8.20 | 1.54 | 0.00 | 299 | 1.07 | 132 | 78 |
| 6g | 2d | 1.14 | argon | tube | 275 | 0.81 | 8.66 | 1.71 | 0.00 | 390 | 0.99 | 96 | 75 |
| 6h | 3b | 1.17 | argon | tube | 275 | 0.84 | 9.66 | 1.87 | 0.00 | 500 | 0.93 | 54 | 89 |
| 6i | 3d | 1.40 | argon | tube | 275 | 0.90 | 10.04 | 1.88 | 0.00 | 636 | 0.76 | 36 | 442 |
| 6j | 3f | 1.40 | argon | tube | 275 | 0.95 | 9.97 | 1.96 | 0.00 | 542 | 0.93 | 57 | 40 |
| 6k | 3h | 1.51 | argon | tube | 300 | 0.95 | 9.73 | 1.91 | 0.00 | 635 | 0.93 | 48 | 108 |
| 6l | 3g | 1.47 | argon | tube | 300 | 1.03 | 9.85 | 1.89 | 0.00 | 601 | 0.88 | 45 | 70 |
| 6m | 3i | 2.15 | argon | tube | 300 | 1.50 | 9.63 | 1.92 | 0.00 | 600 | 1.02 | 56 | 57 |
| 6n | 3j | 2.41 | argon | tube | 300 | 1.67 | 9.96 | 1.83 | 0.00 | 575 | 0.99 | 50 | 25 |
| 6o | 3k | 2.43 | argon | tube | 300 | 1.63 | 9.72 | 1.77 | 0.00 | 608 | 0.88 | 45 | 52 |
| 6p | 3l | 1.51 | argon | tube | 300 | 1.36 | 8.29 | 1.59 | 0.00 | 243 | 0.77 | 119 | 31 |
| 6q | 3m | 1.60 | argon | tube | 300 | 1.24 | 7.56 | 1.46 | 0.00 | 242 | 0.75 | 122 | 29 |
| 6r | 3f | 4.64 | argon | tube | 300 | 3.35 | 10.24 | 1.93 | 0.00 | 537 | 0.93 | 57 | 34 |
| 6s | 3n | 2.20 | argon | tube | 300 | 1.46 | 9.54 | 1.79 | 0.00 | 572 | 0.98 | 59 | 43 |
| 6t | 3o | 2.52 | argon | tube | 300 | 1.34 | 9.98 | 1.87 | 0.00 | 561 | 0.94 | 50 | 23 |
| 6u | 3p | 2.56 | argon | tube | 300 | 1.73 | 9.99 | 1.85 | 0.00 | 576 | 0.93 | 48 | 21 |
| 6v | 3q | 2.43 | argon | tube | 300 | 1.70 | 9.30 | 1.88 | 0.00 | 422 | 0.56 | 48 | 51 |

Example 7

The particles of example 5 g were suspended in hexamethyldisilazane (HMDS, Aldrich Chemical, Milwaukee, Wis.). The suspension was then transferred to a glass lined stainless steel autoclave and heated at 200° C. for 20 hours, under a static argon blanket. After the autoclave cooled to room temperature the product was filtered and washed repeatedly using toluene, acetone/water, and acetone, and then dried at 80° C. under vacuum for 16 hours. % C and % H data are listed in Table 7.

TABLE 7

| Product | Particle Reagent | Particle (g) | % C | % H |
|---|---|---|---|---|
| 7a | 5 g | 7 | 17.37 | 3.39 |

Example 8

A porous inorganic/organic hybrid monolith was synthesized by the following procedure. A non-ionic surfactant, Pluronic® P105 (15.9 g, Aldrich Chemical) was dissolved in 100 mL of 0.09 M acetic acid (J.T. Baker) and chilled to 0° C. To this solution was added a mixture of 1,2-bis-(trimethoxysilyl)ethane (5.8 mL, Gelest Inc., Morrisville, Pa.) and tetramethoxysilane (34.2 mL, Aldrich Chemical). The resulting solution was stirred at 0° C. for 1.5 h and then aliquots were transferred to glass vials, sealed, and kept at 45° C. for 2 days. The solution solidified, and a white rod was produced, which was then immersed into a 0.1 M ammonium hydroxide (J.T. Baker) water solution at 60° C. for 16 hours. The resultant rods were washed by immersing in refluxing water for 3 h, cooling, replacing the water, and repeating a second three hours. A second wash cycle was repeated using methanol (HPLC grade, J.T. Baker). Selected rods were vacuum dried at 80° C. for 16 h. Characterization data is listed in Table 8.

TABLE 8

| Product | Composition of Hybrid Material Prior to Modification | MPD (μm) | MPV (cm³/g) | SSA (m²/g) | SPV (cm³/g) | APD (Å) |
|---|---|---|---|---|---|---|
| 8a | $SiO_2/[C_2H_4(SiO_{1.5})_2]_{0.1}$ | 12.6 | 2.70 | 693 | 1.47 | 69 |

To achieve a porous hybrid inorganic/organic monolith comprising ordered domains and having a chromatographically-enhancing pore geometry, a monolith of type 8a would be immersed in an aqueous solution containing sodium hydroxide (Aldrich Chemical, Milwaukee, Wis.) and one or more of the following pore templating molecules (PTM): cetyltrimethylammonium bromide ($C_{16}$-TAB, Aldrich Chemical), trimethylstearylammonium chloride ($C_{18}$-TAC, TCI America, Portland, Oreg.), cetyltrimethylammonium chloride ($C_{16}$-TAC, 25 wt % in water, Aldrich Chemical), Brij® 76 (Aldrich Chemical), Pluronic® P123 (Aldrich Chemical); and one or more of the following template swelling molecules (TSM): 1,3,5-trimethylbenzene (TMB, Aldrich Chemical), 1,3,5-triisopropylbenzene (TIP, Aldrich Chemical). The suspended monolith would be immersed for 0.5 hours and was then enclosed in a stainless steel autoclave and heated to between 115° C. and 150° C. for 24-118 hours. After the autoclave cooled to room temperature, the monolith would be removed and washed repeatedly as described above with water and then methanol, and then dried at 80° C. under vacuum for 16 hours.

Example 9

XRPD data were collected using two methods (A and B) as described below. Peak maxima for selected materials are listed in Table 9.

Method A data were collected by SSCI Incorporated, West Lafayette, Ind. Sample Preparation Specimens were very firmly packed into a depression in a silicon zero-background holder (ZBH) mounted on aluminum. The specimen surfaces were very carefully leveled by pressing a smooth, glass slide onto the specimen until the specimen surface was flush with the top surface of the ZBH. The surface of the specimen and ZBH was examined with an optical microscope and a flat edge to check for flatness and flushness. Technique: NIST SRM 649C Si powder, d-space calibrant was measured as an external standard. The XPRD patterns were collected with a Shimadzu XRD-6000 using the following instrumental parameters. Radiation: long, fine focus; Anode: Cu; Power: 40 kV and 40 mA; 2θ Range: 1.0° to 10° 2θ or 0.8° to 50° 2θ; Step 0.04° 2θ; Scan Speed: 0.6° 2θ/minute; Divergence slit: 0.5°; Anti-scatter slits: 0.5°; receiving slits: 0.15 mm; Detector: NaI scintillation counter; Diffracted-beam monochrometer: graphite. The diffractogram plots were not smoothed, and no background subtraction was employed. Diffraction peak maxima were determined manually from the diffractogram plot. Diffraction peaks were broad, approximately 1° 2θ.

Method B data were collected by H&M Analytical Services, Inc., Allentown, N.J. All diffraction scans were run on a Siemens D5000 Θ/Θ diffractometer in a Bragg-Brentano parafocusing geometry and using Cu radiation at 40 KV/30 mA from a long fine focus tube. Scans were run over the angular range of 1° to 6° with a step size of 0.05° and counting times of 300 to 600 seconds per step. To reduce the angular divergence and reduce the background, narrow slits were used (divergence slit=0.1 mm, anti-scatter slit=0.2 mm, detector slit=0.1 mm). Under these conditions, the angular divergence of the instrument is approximately 0.05°. Since the individual diffraction peaks were in the neighborhood of 0.4° to 0.5°, the chosen step size provided 8-10 data points within the FWHM, which is adequate for determining the peak positions. Two types of scans were run. The first consisted of the test sample, which was deposited onto a zero background holder and thinned to a layer thickness of approximately 50 μm by use of a methanol slurry. This method has the added advantage of producing a very smooth surface, which is desirable for low angle work. The second type of test consisted of the test sample mixed with a small amount of Silver Behenate ($C_{22}H_{44}O_2Ag$ produced by Kodak and described in *Powder Diffraction*, 10, 91-95 (1995)). Silver Behenate is an ideal low-angle standard due to its very large lattice parameter that produces a series of diffraction lines at angles as low as 1.513°. To perform the internal calibration using Silver Behenate, the pattern containing the internal standard was first modified to bring the Silver Behenate peaks into their calibrated positions. Once this was done, the unspiked sample was then corrected to bring it into coincidence with the features of the standard pattern that are common to both patterns. This indirect method of internal calibration had to be used since the strongest peak from the standard and the strongest peak from the test material overlapped. Although this indirect method is not as accurate as the conventional internal standard method, the accuracy is still deemed to be quite good, with an expected error of approximately 0.02°, which is about ten times better than the uncorrected pattern. All patterns were analyzed with the use of the commercial program Jade v6.5 (produced by Materials Data Inc.). Each pattern was corrected for systematic errors by use of the internal standard. The background was then fitted with a parabolic fitting function and stripped. There was no reason to remove the $K\alpha_2$ peak artifact, since it is so close to the $K\alpha_1$ peak at these low angles that they are indistinguishable. Once the background was removed, the peak positions were then determined by a centroid fitting function. These positions were then refined with the aid of a least squares process that fits the individual peaks to a split Pearson VII function.

TABLE 9

| Product | XRPD Method | XRPD Peak Maxima (°2θ) |
|---------|-------------|------------------------|
| 5e      | A           | 1.3                    |
| 6i      | A           | 1.5, 3.2               |
| 6j      | A           | 1.5, 2.5               |
| 6l      | A           | 1.5, 2.5, 3.2          |
| 6m      | A           | 1.5, 2.5               |
| 6n      | A           | 1.5, 2.5               |
| 6o      | A           | 1.5, 2.5               |
| 6r      | A           | 1.5, 2.5               |
| 6s      | A           | 1.5, 2.5               |
| 6t      | A           | 1.5, 2.5               |
|         | B           | 1.9, 2.6               |
| 6u      | A           | 1.5, 2.5               |
| 6v      | A           | 1.5, 2.5, 3.2          |

Example 10

Figure 5:
FIG. 5 shows a transmission electron micrograph (TEM) of two materials: A (a hybrid material with ordered domains in accordance with the invention) and B (an inorganic material with ordered domains).
Figure 5:
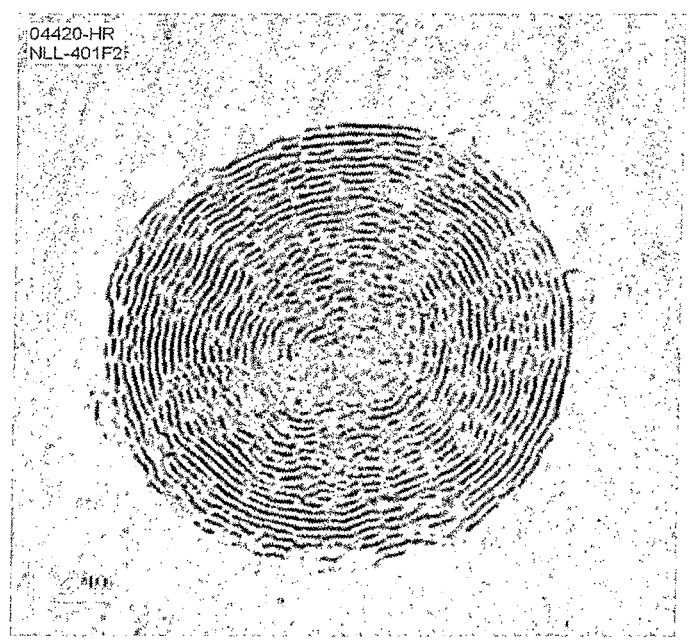

FIG. 5 shows a transmission electron micrograph of compounds A and B. Compound A, a porous inorganic/organic hybrid material having ordered domains, is prepared as described in Example 6. Compound B is an inorganic material (silica gel) with ordered domains. Compounds A and B were examined using transmission electron microscopy (TEM). The micrograph of FIG. 5 shows patterns that are characteristic of materials having ordered domains.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. The contents of all references, issued patents, and published patent applications cited throughout this application are hereby incorporated by reference.

What is claimed is:

1. A porous hybrid inorganic/organic particle or monolith comprising ordered domains and having a chromatographically-enhancing pore geometry, prepared by a method comprising the steps of:
   (a) forming a pore restructuring template;
   (b) restructuring the pores of the porous hybrid inorganic/organic particle or monolith by contacting the pores of the porous hybrid inorganic/organic particle or monolith with the pore restructuring template, to thereby restructure the pores into ordered domains; and
   (c) removing the pore restructuring template from the restructured pores; to thereby prepare the porous hybrid inorganic/organic particle or monolith comprising ordered domains;
wherein the pores of a diameter of 34 Å or less contribute less than about 110 m$^2$/g to the specific surface area of the particle or monolith and the ratio of the micropore surface area to the specific surface area is from 0.036 to 0.273, wherein the particle or monolith has a specific pore volume of about 0.25 to 1.5 cm³/g and an average pore diameter of about 50 to 500 Å, and wherein diffraction peaks are present for said ordered domains in the range of 0.8 to 20° 2θ, and wherein the diffraction peak maxima observed for said particle or monolith exhibit a 2θ position that excludes diffraction peaks ranging from about 20° to about 23° 2θ resulting from atomic-range order that are associated with amorphous material.

2. The inorganic/organic hybrid particle or monolith of claim 1, wherein said inorganic portion of said hybrid particle or monolith is selected from the group consisting of alumina, silica, titanium oxide, zirconium oxide, and ceramic materials.

3. The inorganic/organic hybrid particle or monolith of claim 2 wherein said inorganic portion of said hybrid particle or monolith is silica.

4. The inorganic/organic hybrid particle or monolith of claim 1, which is a porous inorganic/organic hybrid particle.

5. The inorganic/organic hybrid particle or monolith of claim 1, which is a monolith.

6. The inorganic/organic hybrid monolith of claim 5, wherein said monolith comprises coalesced porous inorganic/organic hybrid particles.

7. The inorganic/organic hybrid particle of claim 4, wherein said particle is essentially spherical.

8. The inorganic/organic hybrid particle of claim 4, wherein said particle has a specific surface area of about 50 to 800 m²/g.

9. The inorganic/organic hybrid particle of claim 8, wherein said particle has a specific surface area of about 100 to 700 m²/g.

10. The inorganic/organic hybrid particle of claim 8, wherein said particle has a specific surface area of about 300 to 600 m²/g.

11. The inorganic/organic hybrid particle of claim 8, wherein said particle has specific pore volumes of about 0.7 to 1.3 cm³/g.

12. The inorganic/organic hybrid particle of claim 8, wherein said particle has an average pore diameter of about 50 to 300 Å.

13. The inorganic/organic hybrid particle or monolith of claim 1, wherein said particle or monolith has the micropore surface area of less than about 105 m²/g.

14. The inorganic/organic hybrid particle or monolith of claim 13, wherein said particle or monolith has the micropore surface area of less than about 80 m²/g.

15. The inorganic/organic hybrid particle or monolith of claim 14, wherein said particle or monolith has the micropore surface area of less than about 50 m²/g.

16. The inorganic/organic hybrid particle of claim 4, wherein said particle has been surface modified by a surface modifier selected from the group consisting of an organic group surface modifier, a silanol group surface modifier, a polymeric coating surface modifier, and combinations thereof.

17. The inorganic/organic hybrid particle of claim 16, wherein said hybrid particle has been surface modified with a surface modifier having the formula $Z_a(R')_b Si—R$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

18. The inorganic/organic hybrid particle of claim 17, wherein R' is selected from the group consisting of methyl, ethyl, propyl, isopropyl, butyl, t-butyl, sec-butyl, pentyl, isopentyl, hexyl and cyclohexyl.

19. The inorganic/organic hybrid particle of claim 17, wherein the functionalizing group R is selected from the group consisting of alkyl, alkenyl, alkynyl, aryl, cyano, amino, diol, nitro, ester, a cation exchange group, anion exchange group, an alkyl group containing an embedded polar functionality, and aryl group containing an embedded polar functionality.

20. The inorganic/organic hybrid particle of claim 19, wherein said functionalizing group R is a $C_1$-$C_{30}$ alkyl group.

21. The inorganic/organic hybrid particle of claim 19, wherein said functionalizing group R is a $C_1$-$C_{20}$ alkyl group.

22. The inorganic/organic hybrid particle of claim 16, wherein said surface modifier is selected from the group consisting of octyltrichlorosilane, octadecyltrichlorosilane, octyldimethylchlorosilane, and octadecyldimethylchlorosilane.

23. The inorganic/organic hybrid particle of claim 22, wherein said surface modifier is octyltrichlorosilane or octadecyltrichlorosilane.

24. The inorganic/organic hybrid particle of claim 16, wherein said particle has been surface modified by coating with a polymer.

25. The inorganic/organic hybrid particle of claim 16, wherein said particle has been surface modified by a combination of an organic group surface modifier and a silanol group surface modifier.

26. The inorganic/organic hybrid of claim 16, wherein said particle has been surface modified by a combination of an organic group surface modifier and a polymeric coating surface modifier.

27. The inorganic/organic hybrid particle of claim 16, wherein said particle has been surface modified by a combination of a silanol group surface modifier and a polymeric coating surface modifier.

28. The inorganic/organic hybrid particle of claim 16, wherein said particle has been surface modified via formation of an organic covalent bond between an organic group of the particle and a surface modifier.

29. The inorganic/organic hybrid particle of claim 16, wherein said particle has been surface modified by a combination of an organic group surface modifier, a silanol group surface modifier, and a polymeric coating surface modifier.

30. The inorganic/organic hybrid particle of claim 16, wherein said particle has been surface modified by a silanol group surface modifier.

31. The inorganic/organic hybrid particle or monolith of claim 1 having the formula $SiO_2/(R^2_p R^4_q SiO_t)_n$ or $SiO_2/[R^6(R^2_r SiO_t)_m]_n$ wherein $R^2$ and $R^4$ are independently $C_1$-$C_{18}$ aliphatic or aromatic moieties optionally substituted with alkyl, aryl, cyano, amino, hydroxyl, diol, nitro, ester, ion exchange or embedded polar functionalities, $R^6$ is a substituted or unsubstituted $C_1$-$C_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when x=0, t=1.5, and when r=1, t=1; m is an integer greater than or equal to 2, and n is a number from 0.03 to 1.5.

32. The inorganic/organic hybrid particle or monolith of claim 31, wherein n is a number from 0.1 to 1.0.

33. The inorganic/organic hybrid particle or monolith of claim 31, wherein n is a number from 0.2 to 0.5.

34. A porous hybrid inorganic/organic particle or monolith comprising ordered domains and having a chromatographically-enhancing pore geometry and having formula I, II or III below:

$$(A)_x(B)_y(C)_z \quad \text{(Formula I)}$$

wherein the order of repeat units A, B, and C is random, block, or a combination of random and block;
A is an organic repeat unit which is covalently bonded to one or more repeat units A or B via an organic bond;
B is an organosiloxane repeat unit which is bonded to one or more repeat units B or C via an inorganic siloxane bond and which may be further bonded to one or more repeat units A or B via an organic bond;
C is an inorganic repeat unit which is bonded to one or more repeat units B or C via an inorganic bond; and
x, y are positive numbers and z is a non negative number, wherein
when z=0, then 0.002≤x/y≤210, and when z≠0, then 0.0003≤y/z≤500 and 0.002≤x/(y+z)≤210; or $$(A)_x(B)_y(B^*)_{y^*}(C)_z \quad \text{(Formula II)}$$

wherein the order of repeat units A, B, B*, and C is random, block, or a combination of random and block;
A is an organic repeat unit which is covalently bonded to one or more repeat units A or B via an organic bond;
B is an organosiloxane repeat units which is bonded to one or more repeat units B, B*, or C via an inorganic siloxane bond and which may be further bonded to one or more repeat units A or B via an organic bond;
B* is an organosiloxane repeat unit which is bonded to one or more repeat units B, B*, or C via an inorganic siloxane bond, wherein the B* organosiloxane repeat unit does not have reactive organic components and may further have a protected functional group that may be deprotected after polymerization;
C is an inorganic repeat unit which is bonded to one or more repeat units B, B*, or C via an inorganic bond; and
x, y are positive numbers and z is a non negative number, wherein
when z=0, then 0.002≤x/(y+y*)≤210, and when z≠0, then
0.0003≤(y+y*)/z≤500 and 0.002≤x/(y+y*+z)≤210;

$$[A]_y[B]_x \quad \text{(Formula III)},$$

wherein x and y are whole number integers and A is $$SiO_2/(R^1_p R^2_q SiO_t)_n \text{ or } SiO_2/[R^3(R^1_r SiO_t)_m]_n;$$

wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100;
B is $$SiO_2/(R^4_v SiO_t)_n$$

wherein $R^4$ is hydroxyl, fluorine, alkoxy, aryloxy, substituted siloxane, protein, peptide, carbohydrate, nucleic acid, or combinations thereof, $R^4$ is not $R^1$, $R^2$, or $R^3$; v is 1 or 2, provided that when v=1, t=1.5, and when t=1; and n is a number from 0.01 to 100;
wherein the particle or monolith of formula III has an interior area and an exterior surface, and said interior area of said particle or monolith has a composition represented by A; said exterior surface of said particle or monolith has a composition represented by A and B, and wherein said exterior composition is between 1 and 99% of the composition of B and the remainder comprising A,
wherein said particle or monolith is prepared by a method comprising the steps of;
(a) forming a pore restructuring template;
(b) restructuring the pores of the porous hybrid inorganic/organic particle or monolith by contacting the pores of the porous hybrid inorganic/organic article or monolith with the pore restructuring template, to thereby restructure the pores into ordered domains; and
(c) removing the pore restructuring template from the restructured pores; to thereby prepare the porous hybrid inorganic/organic particle or monolith comprising ordered domains;
wherein the pores of a diameter of 34 Å or less contribute less than about 110 m²/g to the specific surface area of the particle or monolith and the ratio of the micropore surface area to the specific surface area is from 0.036 to 0.273,
wherein the particle or monolith has a specific pore volume of about 0.25 to 1.5 cm³/g and an average pore diameter of about 50 to 500 Å,
and wherein diffraction peaks are present for said ordered domains in the range of 0.8 to 20°2θ,
and wherein the diffraction peak maxima observed for said particle or monolith exhibit a 2θ position that excludes diffraction peaks ranging from about 20° to about 23°2θ resulting from atomic-range order that are associated with amorphous material.

35. The inorganic/organic hybrid particle or monolith of Formula II according to claim 34, wherein B is bonded to one or more repeat units B or C via an inorganic siloxane bond and is bonded to one or more repeat units A or B via an organic bond.

36. The inorganic/organic hybrid particle or monolith of Formula I or II according to claim 34, wherein 0.003≤y/z≤50 and 0.02≤x/(y+z)≤21.

37. The inorganic/organic hybrid particle or monolith of Formula I or II according to claim 34, wherein 0.03≤y/z≤5 and 0.2≤x/(y+z)≤2.1.

38. The inorganic/organic hybrid particle or monolith of Formula I or II according to claim 34, wherein A is a substituted ethylene group, B is a oxysilyl-substituted alkylene group, and C is a oxysilyl group.

39. The inorganic/organic hybrid particle or monolith of Formula I or II according to claim 34, wherein A is selected from the group consisting of

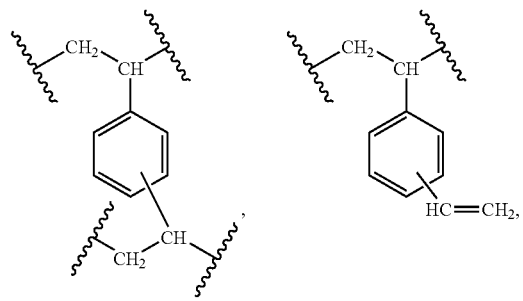

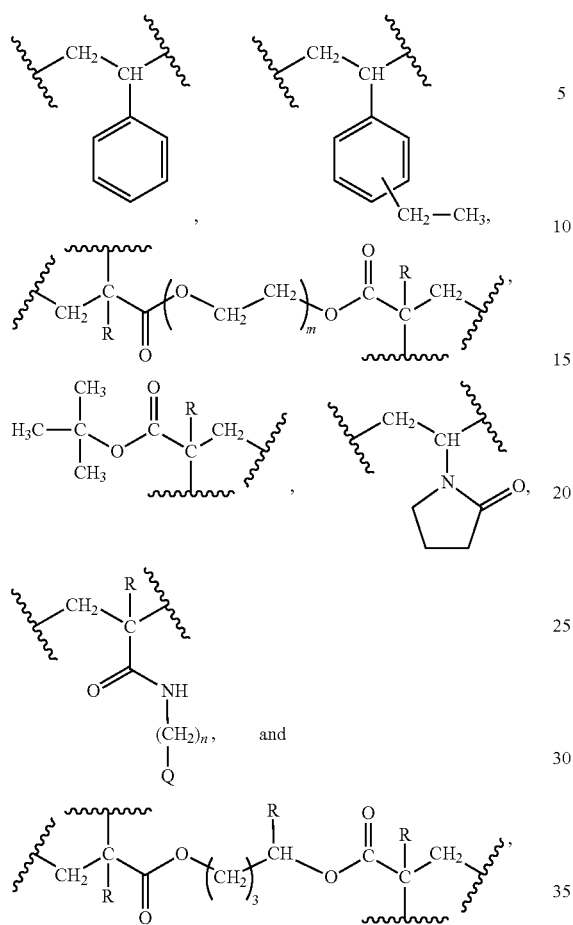

wherein each R is independently H or a $C_1$-$C_{10}$ alkyl group; m is an integer of from 1 to 20; n is an integer of from 0 to 10; and Q is hydrogen, $N(C_{1-6}alkyl)_3$, $N(C_{1-6}alkyl)_2(C_{1-6}alkylene-SO_3)$, or $C(C_{1-6}hydroxyalkyl)_3$.

40. The inorganic/organic hybrid particle or monolith according to claim 39, wherein each R is independently hydrogen, methyl, ethyl, or propyl.

41. The inorganic/organic hybrid particle or monolith of Formula I or II according to claim 34, wherein B is selected the group consisting of

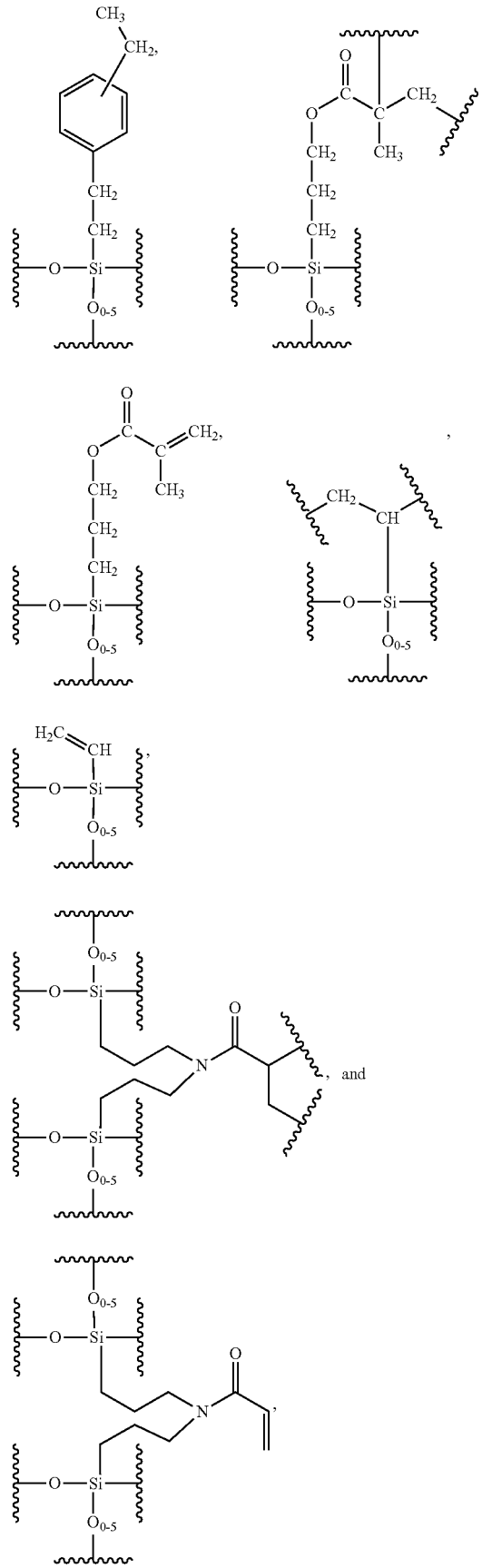

and wherein B* is selected from a group consisting of

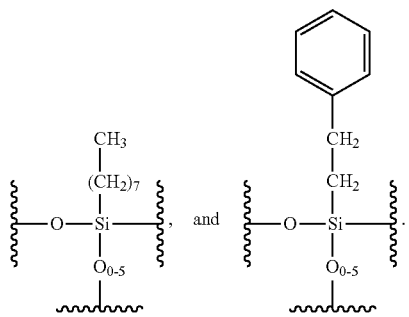

42. The inorganic/organic hybrid particle or monolith of Formula I or II according to claim 34, wherein C is

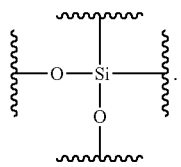

43. The inorganic/organic hybrid particle or monolith of Formula III of claim 34, wherein said exterior surface has a composition that is between about 50 and about 90% of composition B, with the remainder comprising composition A.

44. The inorganic/organic hybrid particle or monolith of claim 43 wherein said exterior surface has a composition that is between about 70 and about 90% of composition B, with the remainder comprising composition A.

45. The inorganic/organic hybrid particle or monolith of Formula III of claim 34, wherein $R^4$ is hydroxyl.

46. The inorganic/organic hybrid particle or monolith of Formula III of claim 34, wherein $R^4$ is fluorine.

47. The inorganic/organic hybrid particle or monolith of Formula III of claim 34, wherein $R^4$ is methoxy.

48. The inorganic/organic hybrid particle or monolith of Formula III of claim 34, wherein $R^4$ is $$-OSi(R^5)_2-R^6$$

wherein $R^5$ is a $C_1$ to $C_6$ straight, cyclic, or branched alkyl, aryl, or alkoxy group, a hydroxyl group, or a siloxane group, and $R^6$ is a $C_1$ to $C_{36}$ straight, cyclic, or branched alkyl, aryl, or alkoxy group, wherein $R^6$ is unsubstituted or substituted with one or more moieties selected from the group consisting of halogen, cyano, amino, dial, nitro, ether, carbonyl, epoxide, sulfonyl, cation exchanger, anion exchanger, carbamate, amide, urea, peptide, protein, carbohydrate, nucleic acid functionalities, and combinations thereof.

49. The inorganic/organic hybrid particle or monolith of claim 48, wherein $R^6$ is a $C_{18}$ group.

50. The inorganic/organic hybrid particle or monolith of claim 48, wherein $R^6$ is a cyanopropyl group.

* * * * *